US012384001B2

(12) United States Patent
Otani et al.

(10) Patent No.: US 12,384,001 B2
(45) Date of Patent: Aug. 12, 2025

(54) ELECTRIC TOOL

(71) Applicant: MAKITA CORPORATION, Anjo (JP)

(72) Inventors: Ryosuke Otani, Anjo (JP); Fumiyoshi Saito, Anjo (JP)

(73) Assignee: MAKITA CORPORATION, Anjo (JP)

( * ) Notice: Subject to any disclaimer, the term of this patent is extended or adjusted under 35 U.S.C. 154(b) by 696 days.

(21) Appl. No.: 17/856,718

(22) Filed: Jul. 1, 2022

(65) Prior Publication Data

US 2023/0023204 A1 Jan. 26, 2023

(30) Foreign Application Priority Data

Jul. 21, 2021 (JP) ................................ 2021-120299

(51) Int. Cl.
*B24B 23/02* (2006.01)
*B25F 5/02* (2006.01)

(52) U.S. Cl.
CPC ............. *B24B 23/028* (2013.01); *B25F 5/02* (2013.01)

(58) Field of Classification Search
CPC .............................. B24B 23/028; B25F 5/026
See application file for complete search history.

(56) References Cited

U.S. PATENT DOCUMENTS

2021/0220959 A1 7/2021 Matsubara et al.

*Primary Examiner* — Daniel Jeremy Leeds
(74) *Attorney, Agent, or Firm* — Oliff PLC

(57) ABSTRACT

An electric tool includes a motor, a first intermediate member configured to be displaced when a first accessory is attached to a first attachment portion, a second intermediate member configured to be displaced when a second accessory is attached to a second attachment portion, and a first interlock member. The first interlock member mechanically moves in conjunction with the respective displacements of the first intermediate member and the second intermediate member. The first interlock member is displaced in the same direction between when the first accessory is attached and when the second accessory is attached, and is cumulatively displaced when the first accessory and the second accessory are attached. The electric tool is configured in such a manner that power supply to the motor is permitted only in a state that the first interlock member is cumulatively displaced.

14 Claims, 20 Drawing Sheets

ELECTRIC TOOL

TECHNICAL FIELD

The present disclosure relates to an electric tool configured to allow an accessory to be detachably attached thereto.

BACKGROUND

Various kinds of accessories may be detachably attached to electric tools. For example, two types of detachably attachable accessories (a side handle and a cover) are prepared for a grinder including a tool accessory (also referred to as a wheel, a disk, a blade, or the like) configured to be rotationally driven. The side handle is attached to be held with the other hand when a user holds a handle of the grinder with one of his/her hands. The cover is attached to partially cover the tool accessory.

For such a grinder, there is a demand for preventing the grinder from being used in a state that the accessory is not attached. For example, US2021/0220959A1 discloses a grinder including a first link member that is displaced when a side handle is attached, a first sensor that detects the displacement of the first link member, a second link member that is displaced when a cover is attached, a second sensor that detects the displacement of the second link member, and a controller. The controller permits power supply to the motor (i.e., the rotation of the tool accessory) only when the attachment of both the side handle and the cover is detected by the first sensor and the second sensor.

SUMMARY

The present specification discloses an electric tool. This electric tool may include a motor, a first attachment portion for detachably attaching a first accessory, a second attachment portion for detachably attaching a second accessory that is a different type of accessory from the first accessory, a first intermediate member configured to be displaced by being directly or indirectly pressed by the first accessory when the first accessory is attached to the first attachment portion, a second intermediate member configured to be displaced by being directly or indirectly pressed by the second accessory when the second accessory is attached to the second attachment portion, and a first interlock member. The first interlock member may be configured to mechanically move in conjunction with the respective displacements of the first intermediate member and the second intermediate member. The first interlock member may be further configured to be displaced in the same direction between when the first accessory is attached to the first attachment portion and when the second accessory is attached to the second attachment portion, and be cumulatively displaced when the first accessory and the second accessory are attached to the first attachment portion and the second attachment portion, respectively. The electric tool may be configured in such a manner that power supply to the motor is permitted only in a state that the first interlock member is cumulatively displaced.

According to this electric tool, a novel structure is provided in which the power supply to the motor is permitted only in the state that the first accessory and the second accessory are attached to the first attachment portion and the second attachment portion respectively and thus the first interlock member is cumulatively displaced by moving in conjunction with the first intermediate member and the second intermediate member. Therefore, this electric tool can increase the design flexibility of the electric tool having the structure in which the power supply to the motor is permitted only in the state that the two types of accessories are attached thereto. For example, the first intermediate member, the second intermediate member, and the first interlock member can be collectively disposed in a free space in the housing. Further, since the first interlock member moves in conjunction with both the first intermediate member and the second intermediate member (i.e., the first interlock member is shared by the first intermediate member and the second intermediate member), this electric tool can efficiently realize the configuration that permits the power supply to the motor only in the state that both the first accessory and the second accessory are attached thereto. For example, in an embodiment in which the electric tool includes a sensor that detects the cumulative displacement of the first interlock member, the attachment of both the first accessory and the second accessory can be detected using the single sensor.

DETAILED DESCRIPTION OF THE EMBODIMENTS

Figure 1:
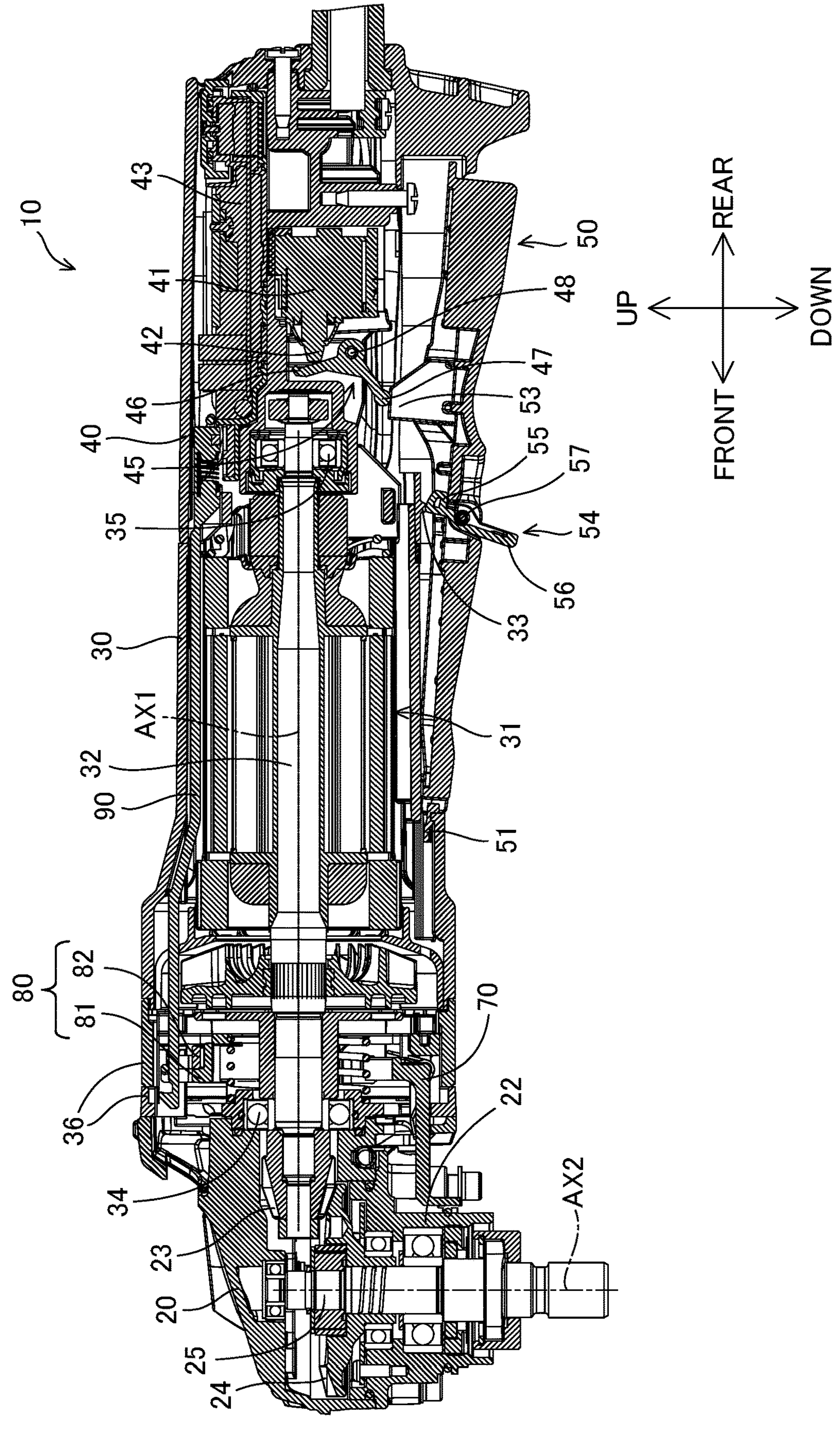
FIG. 1 is a vertical cross-sectional view of a grinder according to one embodiment, and illustrates the grinder with a tool accessory, and a side handle and a cover as accessories detached therefrom.

In one or more embodiment(s), the electric tool may include a sensor configured to directly or indirectly detect the cumulative displacement of the first interlock member, and a controller configured to control the power supply to the motor and configured to permit the power supply to the motor only in a state that the cumulative displacement of the first interlock member is detected by the sensor. According to this configuration, the attachment of both the first accessory and the second accessory can be detected using the single sensor. Therefore, the design flexibility of the electric tool can be improved. Further, compared to when two sensors are installed individually for the first accessory and the second accessory, respectively, this configuration can lead to a reduction in the number of sensors, i.e., electronic components and thus the number of wiring processes, thereby facilitating the manufacturing.

In one or more embodiment(s), the electric tool may include a second interlock member configured to mechanically move in conjunction with the cumulative displacement of the first interlock member. The first intermediate member, the second intermediate member, and the first interlock member may be disposed on a first side with respect to the motor in an axial direction that is a direction in which a rotational axis of the motor extends. The sensor and the controller may be disposed on a second side opposite from the first side with respect to the motor in the axial direction. The second interlock member may extend from the first side to the second side. The sensor may be configured to detect the cumulative displacement of the first interlock member based on the displacement of the second interlock member. According to this configuration, the sensor and the controller, i.e., the electronic components are disposed on the second side, and therefore the first side does not have to be designed for insulation. This can make the electric tool compact. Further, a wiring for electrically connecting the sensor and the controller does not have to be laid so as to extend across motor, and therefore the wiring length can be reduced and the wiring installability can also be improved.

In one or more embodiment(s), a first attachment direction for attaching the first accessory to the first attachment portion and a second attachment direction for attaching the second accessory to the second attachment portion may be different from each other. The first intermediate member and the second intermediate member may be configured to transmit a pressing force of the first accessory in the first attachment direction and a pressing force of the second accessory in the second attachment direction to the first interlock member while converting them into the same direction as each other. According to this configuration, the respective attachment directions of the first accessory and the second accessory do not have to match each other to realize the configuration in which the first interlock member moves in conjunction with both the first intermediate member and the second intermediate member, and therefore the design flexibility of the electric tool can be improved.

In one or more embodiment(s), the first intermediate member may be configured to move in conjunction with the first interlock member by moving pivotally and pressing the first interlock member when being directly or indirectly pressed by the first accessory. The second intermediate member may be configured to move in conjunction with the first interlock member by moving pivotally and pressing the first interlock member when being directly or indirectly pressed by the second accessory. According to this configuration, the first intermediate member and the second intermediate member can convert the pressing force of the first accessory applied in the first attachment direction and the pressing force of the second accessory applied in the second attachment direction into the same direction as each other with a small number of members.

In one or more embodiment(s), the first attachment portion may include a third-side attachment portion disposed on a third side with respect to a plane containing the rotational axis of the motor and a fourth-side attachment portion disposed on a fourth side opposite from the third side with respect to the plane to allow the first accessory to be selectively attached. The third-side attachment portion and the fourth-side attachment portion may be disposed so as to be symmetric with each other with respect to the plane. The first intermediate member may include a third-side intermediate member disposed adjacent to the third-side attachment portion and a fourth-side intermediate member disposed adjacent to the fourth-side attachment portion. The third-side intermediate member and the fourth-side intermediate member may be disposed so as to be symmetric with each other with respect to the plane. The third-side intermediate member may be configured to be pivotal about a first pivotal axis. The fourth-side intermediate member may be configured to be pivotal about a second pivotal axis extending in the same direction as the first pivotal axis. A first pivotal direction may be opposite from a second pivotal direction. The first pivotal direction is a direction in which the third-side intermediate member moves pivotally when being directly or indirectly pressed by the first accessory. The second pivotal direction is a direction in which the fourth-side intermediate member moves pivotally when being directly or indirectly pressed by the first accessory. According to this configuration, the electric tool, on which the first accessory can be selectively attached to the two attachment positions, allows the first intermediate member and the first interlock member to work in conjunction with each other regardless of which attachment position is used to attach the first accessory.

In one or more embodiment(s), the electric tool may include a first biasing member configured to bias the third-side intermediate member in a direction opposite from the first pivotal direction, and a second biasing member configured to bias the fourth-side intermediate member in a direction opposite from the second pivotal direction. Each of the third-side intermediate member and the fourth-side intermediate member may be in a non-contact state of not contacting the first interlock member or a non-pressing state of not pressing the first interlock member when being not directly or indirectly pressed by the first accessory. According to this configuration, when the first accessory is attached to the third-side attachment portion and the third-side intermediate member moves pivotally in the first pivotal direction to press the first interlock member, the fourth-side intermediate member disposed on the opposite side of the plane from the third-side intermediate member does not press the first interlock member in the direction opposite from the pressing direction of the third-side intermediate member under the biasing force of the second biasing member. Similarly, when the first accessory is attached to the fourth-side attachment portion and the fourth-side intermediate member moves pivotally in the second pivotal direction to press the first interlock member, the third-side intermediate member does not press the first interlock member in the direction opposite from the pressing direction of the fourth-side intermediate member under the biasing force of the first biasing member. Therefore, the first interlock member can be smoothly displaced in the intended direction.

In one or more embodiment(s), the electric tool may include a housing. The first interlock member may include a first member pivotally supported by the housing. The first member may be configured to move in conjunction with the first intermediate member by being pressed by the third-side intermediate member or the fourth-side intermediate member when the first accessory is attached to any of the third-side attachment portion and the fourth-side attachment portion. The first interlock member may include a second member configured to be engaged with the first member and the second intermediate member and move in conjunction with the first member and the second intermediate member. According to this configuration, since the first member is pivotally supported by the housing, the first interlock member (i.e., the first member and the second member engaged with the first member) can smoothly move pivotally even when the first accessory is attached to any of the third-side attachment portion and the fourth-side attachment portion and the first member is pressed by the third-side attachment member or the fourth-side attachment member (i.e., even when the first member is pressed by the third-side attachment member or the fourth-side attachment member only on one side with respect to the above-described plane).

In one or more embodiment(s), the electric tool may be a grinder configured to rotate a tool accessory using a driving force of the motor. The first accessory may be a side handle. The second accessory may be a cover that partially covers the tool accessory.

In the following description, the embodiments will be described in further detail with reference to the drawings. In an embodiment that will be described below, a handheld-type electric disk grinder (hereinafter simply referred to as a grinder) will be cited as an example of an electric tool.

Figure 10:
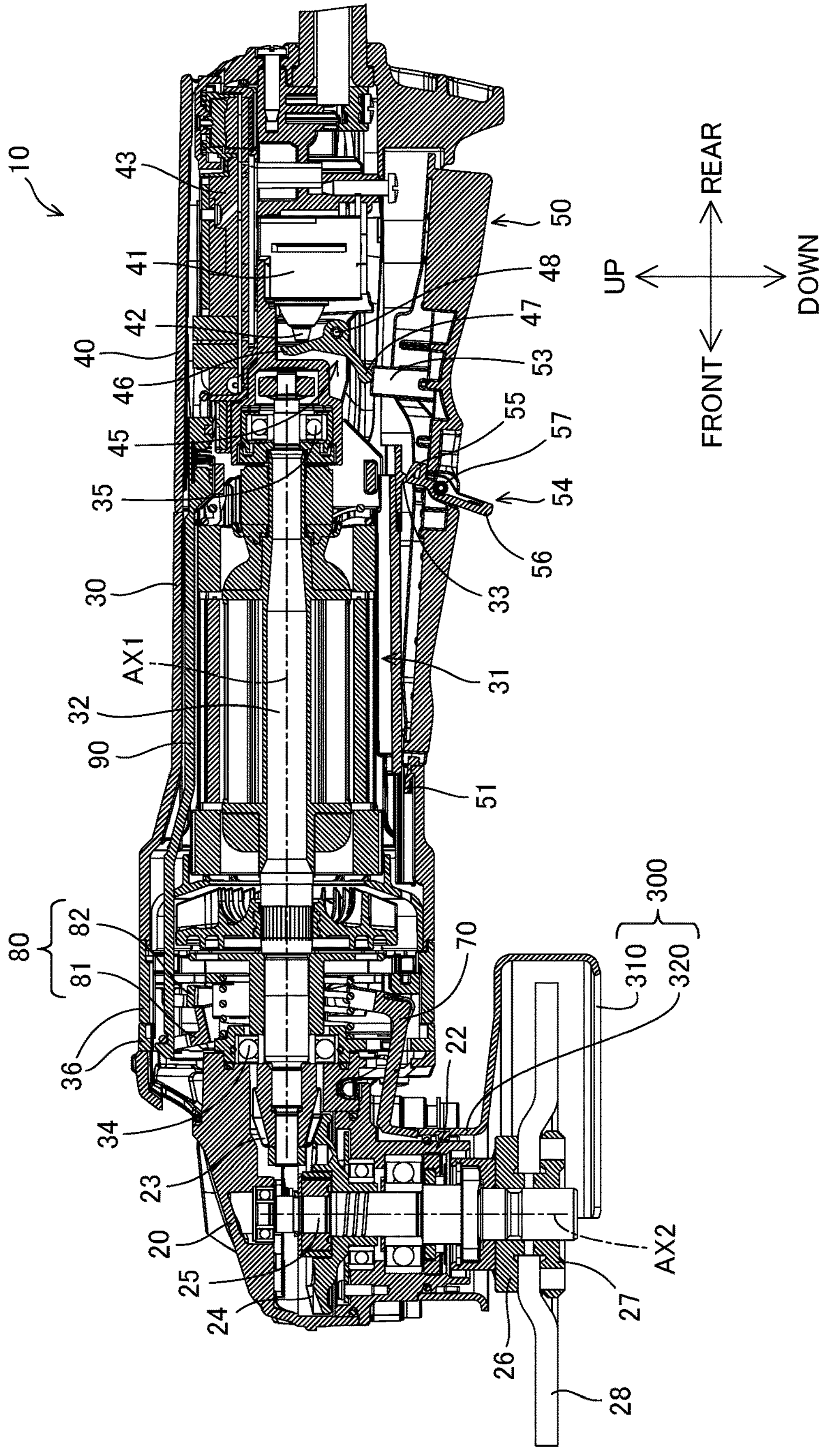
FIG. 10 is a vertical cross-sectional view of the grinder that corresponds to FIG. 1, and illustrates the grinder with the tool accessory, and the side handle and the cover as the accessories attached thereto.

First, the overview of a grinder 10 will be described with reference to FIGS. 1, 2, 10, and 11. As illustrated in FIG. 10, the grinder 10 is configured to rotationally drive a generally disk-shaped tool accessory (an accessory for processing) 28 mounted on a spindle 25. The spindle 25 is rotated by a rotational driving force provided from an electric motor 31. A grinding stone, a rubber pad, a brush, a blade, and the like are prepared as the tool accessory 28 mountable on the grinder 10. A user selects the appropriate tool accessory 28 according to desired processing work and mounts it on the grinder 10. According to the grinder 10, processing work such as grinding, polishing, or cutting can be performed on a processing target material according to the type of the tool accessory 28.

In the following description, a direction in which a rotational axis AX1 of the electric motor 31 (i.e., a motor shaft 32) extends is defined to be a front-rear direction of the grinder 10. One side in the front-rear direction on which the tool accessory 28 is located is defined to be a front side, and the opposite side therefrom is defined to be a rear side. Further, a direction in which a rotational axis AX2 of the spindle 25 (i.e., a rotational axis of the tool accessory 28) extends is defined to be a vertical direction of the grinder 10. One side in the vertical direction on which the tool accessory 28 is located is defined to be a lower side, and the opposite side therefrom is defined to be an upper side. Further, a direction perpendicular to the vertical direction and the front-rear direction is defined to be a left-right direction of the grinder 10. A right side in the left-right direction when the front side is viewed from the rear side is defined to be a right side of the grinder 10, and the opposite side therefrom is defined to be a left side of the grinder 10.

As illustrated in FIGS. 1 and 10, the grinder 10 includes a gear housing 20, a motor housing 30, a handle housing 40, and an intermediate housing 36. The electric motor 31 is contained in the motor housing 30, which is located between the gear housing 20 and the handle housing 40 in the front-rear direction, i.e., the longitudinal direction of the grinder 10. The electric motor 31 (the motor shaft 32) is rotatably supported by a front-side bearing 34 and a rear-side bearing 35. The electric motor 31 is driven by electric power supplied from outside (alternating-current power in the present embodiment, but may be direct-current power). The intermediate housing 36 is located between the gear housing 20 and the motor housing 30 in the front-rear direction, and is formed by two members in the present embodiment. The intermediate housing 36 functions as a bearing support that supports the front-side bearing 34.

As illustrated in FIGS. 1 and 10, a mechanism for transmitting the rotational driving force of the electric motor 31 to the tool accessory 28 is contained in the gear housing 20. More specifically, a small bevel gear 23, a large bevel gear 24, and the spindle 25 are contained in the gear housing 20. The small bevel bear 23 is fixed around the motor shaft 32 at the front end portion of the motor shaft 32 of the electric motor 31. The spindle 25 is supported rotatably about the rotational axis AX2 by bearings disposed so as to be spaced apart from each other in the vertical direction. The rotational axis AX2 intersects with (more specifically, intersects perpendicularly to) the rotational axis AX1 of the electric motor 31. The large bevel gear 24 is fixed around the spindle 25 on the upper side of the spindle 25, and is meshed with the small bevel gear 23. The gear housing 20 includes a second attachment portion 22 at the lower end portion thereof. The second attachment portion 22 is used to detachably attach a cover 300. The second attachment portion 22 has a vertically extending cylindrical shape. The spindle 25 extends vertically in the gear housing 20, and extends out of the gear housing 20 (more specifically, the second attachment portion 22) on the lower side.

As illustrated in FIG. 10, an inner flange 26 is attached around the spindle 25 at the lower end portion of the spindle 25 extending out of the gear housing 20. A male screw portion is formed on a lower portion of the spindle 25 with respect to the inner flange 26, and a lock nut 27 is attached to this male screw portion. The position of the tool accessory 28 relative to the spindle 25 is fixed by sandwiching the tool accessory 28 between the inner flange 26 and the lock nut 27 and tightening the lock nut 27.

The handle housing 40 is a portion to be held by the user with one of his/her hands when the grinder 10 is in use. As illustrated in FIG. 10, the handle housing 40 has a cylindrical shape extending generally in the front-rear direction. A switch 41 for driving the electric motor 31 is contained inside the handle housing 40.

As illustrated in FIGS. 1 and 10, a controller 43 is further contained near the upper portion of the handle housing 40 in the handle housing 40. The controller 43 is located above the switch 41. The controller 43 and the switch 41 are disposed on the rear side with respect to the electric motor 31 in the front-rear direction. The controller 43 is electrically connected to the electric motor 31 and the switch 41. The controller 43 controls the driving of the electric motor 31 by controlling power to be supplied to the electric motor 31. In the present embodiment, the controller 43 includes a high temperature protection circuit, an over current protection circuit, and an over discharge protection circuit. However, one or two of these protection circuits may be omitted.

As illustrated in FIGS. 1 and 10, an operation member 50 is provided at lower portions of the motor housing 30 and the handle housing 40. The operation member 50 is configured to be displaceable between an OFF position for putting the switch 41 in an OFF state, and an ON position for putting the switch 41 in an ON state. The operation member 50 is an elongated member extending in the front-rear direction. The operation member 50 includes a front end portion 51 and a protrusion 53. The front end portion 51 is inserted in a through-hole formed at the bottom portion of the motor housing 30 and extending in the front-rear direction. The front end portion 51 has a recessed and protruding shape engaged with the motor housing 30, and this allows the operation member 50 to be held on the motor housing 30 in an undetachable state. The operation member 50 is configured to be pivotal in the counterclockwise direction from the OFF position illustrated in FIG. 10 to the ON position (not illustrated) with an engagement portion between the front end portion 51 and the motor housing 30 serving as a supporting point therefor. As illustrated in FIGS. 1 and 10, the protrusion 53 extends upward from the upper portion of the operation member 50.

As illustrated in FIGS. 1 and 10, a lock-off member 54 is attached to the operation member 50. The lock-off member 54 is provided at an approximately central position of the operation member 50 in the front-rear direction. The lock-off member 54 is supported by the operation member 50 via a pin 57 supported in a boss formed inside the operation member 50. The lock-off member 54 is pivotal about the pin 57. The lock-off member 54 is constantly biased by a torsion spring (not illustrated) in the clockwise direction as viewed from the left side.

The lock-off member 54 includes an abutment edge portion 55 and an operation edge portion 56. When the lock-off member 54 is located at an initial position illustrated in FIGS. 1 and 10, the operation edge portion 56 protrudes downward via a hole of the lock-off member 54. Further, the abutment edge portion 55 is in abutment with an abutment portion 33, which is formed at the rear end and the bottom portion of the motor housing 30 so as to protrude from the motor housing 30 downward. Therefore, even when the user performs an operation of pressing the operation member 50 upward to displace the operation member 50 from the OFF position (refer to FIGS. 1 and 10) to the ON position (hereinafter also referred to as an ON operation), the pivotal movement of the operation member 50 is prohibited. On the other hand, when the user operates the lock-off member 54 by pulling the operation edge portion 56 rearward with his/her finger, the lock-off member 54 moves pivotally in the counterclockwise direction against the biasing force of the torsion spring. As a result, the abutment edge portion 55 moves pivotally to a position at which it is out of abutment with the abutment portion 33. As a result, the user can pivotally move the operation member 50 to the ON position.

As illustrated in FIGS. 1 and 10, a link member 45 is disposed above the operation member 50. The link member 45 includes a through-hole extending through the link member 45 in the left-right direction, and a pin 48 is inserted in this through-hole. The pin 48 is supported in a boss formed inside the handle housing 40. Due to thereto, the link member 45 is configured to be pivotal about the pin 48. The link member 45 is biased by a torsion spring (not illustrated) in the counterclockwise direction as viewed from the left side.

The link member 45 includes two arms 46 and 47 extending outward in a radial direction with respect to a pivotal axis of the link member 45. The first arm 46 is located on the upper side and the second arm 47 is located on the lower side. When the link member 45 is located at an initial position (refer to FIGS. 1 and 10), the distal end of the second arm 47 is in abutment with the protrusion 53 of the operation member 50. When the user performs the operation of pressing the operation member 50 upward and the operation member 50 is displaced from the OFF position (refer to FIGS. 1 and 10) to the ON position (not illustrated), the second arm 47 is raised upward by the protrusion 53. Accordingly, the link member 45 moves pivotally in the clockwise direction against the biasing force of the torsion spring. At this time, the first arm 46 presses an input member 42 of the switch 41 rearward. As a result, the switch 41 is switched from the OFF state to the ON state. On the other hand, when the user releases the force pressing the operation member 50 upward, the link member 45 returns to the initial position under the biasing force of the torsion spring and the switch 41 returns to the OFF state. At the same time, the operation member 50 also returns to the OFF position by being pressed by the link member 45.

When the operation member 50 is operated from the OFF position to the ON position by the user as described above, the switch 41 detects the operation and transmits a control signal to the controller 43. When receiving this control signal, the controller 43 supplies power to the electric motor 31 and drives the electric motor 31. When the electric motor 31 is driven, the rotation of the motor shaft 32 is transmitted to the spindle 25 while being slowed down via the small bevel gear 23 and the large bevel bear 24. At this time, the direction of the rotational motion is also converted from the direction around the motor shaft 32 into the direction around the rotational axis AX2 of the spindle 25. According to this mechanism, the spindle 25 is rotated around the rotational axis AX2 in response to the rotation of the motor shaft 32, and the tool accessory 28 fixed by the inner flange 26 and the lock nut 27 is rotated together with the spindle 25 as a result thereof.

Figure 11:
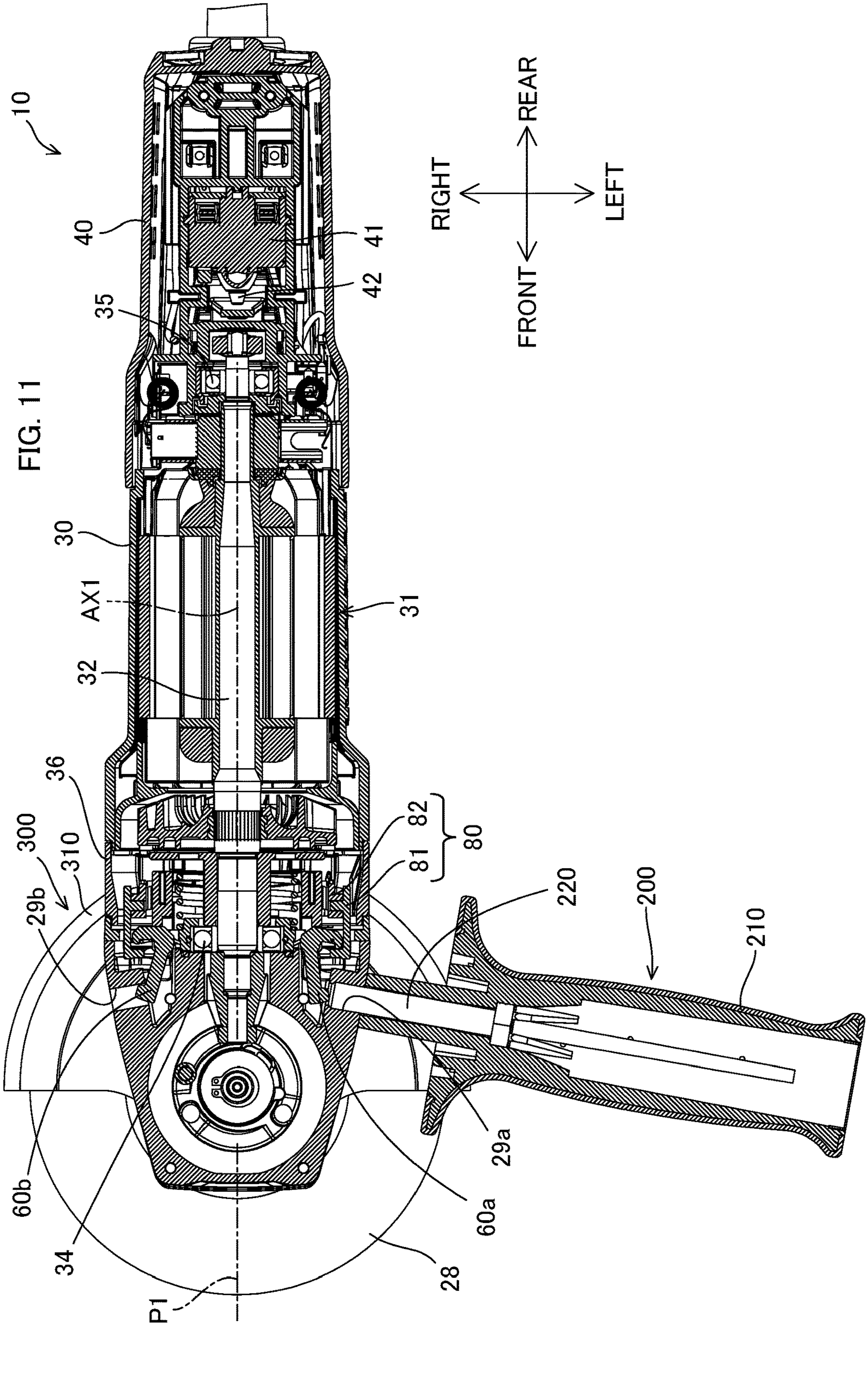
FIG. 11 is a horizontal cross-sectional view of the grinder that corresponds to FIG. 2, and illustrates the grinder with the tool accessory, and the side handle and the cover as the accessories attached thereto.

As illustrated in FIG. 11, the grinder 10 further includes a side handle 200 and a cover 300 as two types of accessories. The side handle 200 is prepared to be held by the user with the opposite hand from his/her hand holding the handle housing 40. The user can further stably hold the grinder 10 by using the side handle 200. The side handle 200 includes a grip portion 210 to be held by the user, and an attachment portion 220 to be attached to the gear housing 20. The attachment portion 220 has a columnar shape extending in the longitudinal direction of the side handle 200, and extends out of one end of the grip portion 210 in the longitudinal direction of the side handle 200. A male screw is formed on the outer peripheral surface of the distal end portion of the attachment portion 220.

Figure 2:
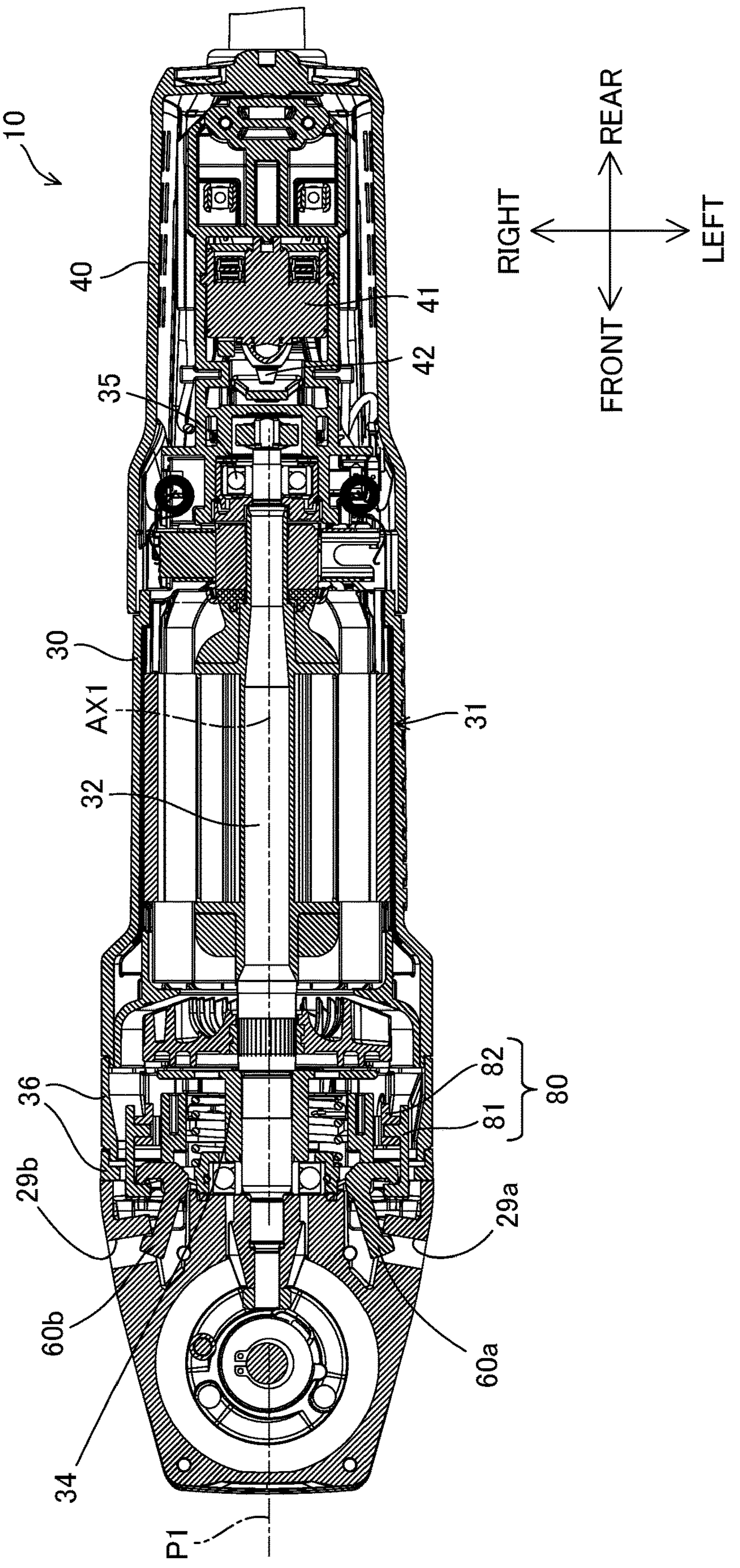
FIG. 2 is a horizontal cross-sectional view of the grinder, and illustrates the grinder with the tool accessory, and the side handle and the cover as the accessories detached therefrom.

As illustrated in FIGS. 2 and 11, the gear housing 20 includes two first attachment portions 29*a* and 29*b* for detachably attaching the side handle 200. The first attachment portion 29*a* is formed on the left side surface of the gear housing 20, and the first attachment portion 29*b* is formed on the right side surface of the gear housing 20. In other words, the first attachment portion 29*a* is located on one side (the left side) with respect to a plane P1 containing the rotational axis AX1 of the electric motor 31 (this plane also contains the rotational axis AX2 of the spindle 25 in the present embodiment), and the first attachment portion 29*b* is located on the opposite side (the right side) with respect to the plane P1. The plane P1 is an imaginary plane extending in the front-rear direction and the vertical direction. More specifically, the first attachment portions 29*a* and 29*b* are disposed so as to be symmetric with respect to the plane P1. Each of the first attachment portions 29*a* and 29*b* is configured in the form of a through-hole that establishes communication between the inside and the outside of the gear housing 20. A female screw threadably engaged with the male screw of the attachment portion 220 of the side handle 200 is formed on the inner surface forming this through-hole.

The side handle 200 can be attached to the gear housing 20 by screwing the attachment portion 220 of the side handle 200 into selected one from the two first attachment portions 29*a* and 29*b*. The user can arbitrarily select the attachment portion of the side handle 200 from the first attachment portions 29*a* and 29*b* according to the type of the work intended to be performed using the grinder 10 or according to whether the user is right-handed or left-handed. FIG. 11 illustrates the grinder 10 with the side handle 200 selectively attached to the first attachment portion 29*a*.

As illustrated in FIG. 10, the cover 300 includes a cover main body 310 to cover a part of the tool accessory 28 therewith, and an attachment portion 320 to be attached to the second attachment portion 22. The cover main body 310 covers an approximately rear half portion of the tool accessory 28. The cover main body 310 covers the upper surface and the circumferential surface of the tool accessory 28 in the present embodiment, but may cover the upper surface, the lower surface, and the circumferential surface between the upper surface and the lower surface depending on the type of the tool accessory 28 in use. The attachment portion 320 has a generally annular opened shape, and extends from the upper surface of the cover main body 310 upward. The attachment portion 320 includes two flanges (not illustrated) opposite in the circumferential direction around the rotational axis AX2 at two distal ends in the circumferential direction. A bolt (not illustrated) is inserted into a screw hole formed at each of the flanges and is tightened with the attachment portion 320 disposed so as to surround the second attachment portion 22 of the gear housing 20, by which the radius of the annular shape of the attachment portion 320 reduces and the attachment portion 320 is fixed to the second attachment portion 22.

The above-described grinder 10 can drive the electric motor 31 only in a state that the side handle 200 is attached to any of the first attachment portions 29*a* and 29*b* of the gear housing 20 and the cover 300 is attached to the second attachment portion 22. In a state that at least one of the side handle 200 and the cover 300 is not attached, the controller 43 prohibits the driving of the electric motor 31 (i.e., the power supply to the electric motor 31) even when the user operates the operation member 50 to the ON position and the control signal indicating that the switch 41 is in the ON state is transmitted from the switch 41 to the controller 43. On the other hand, in the state that both the side handle 200 and the cover 300 are attached, the controller 43 permits the driving of the electric motor 31 when the control signal indicating that the switch 41 is in the ON state is transmitted from the switch 41 to the controller 43. In the following description, such a configuration will be described in detail with reference to the drawings.

Figure 5:
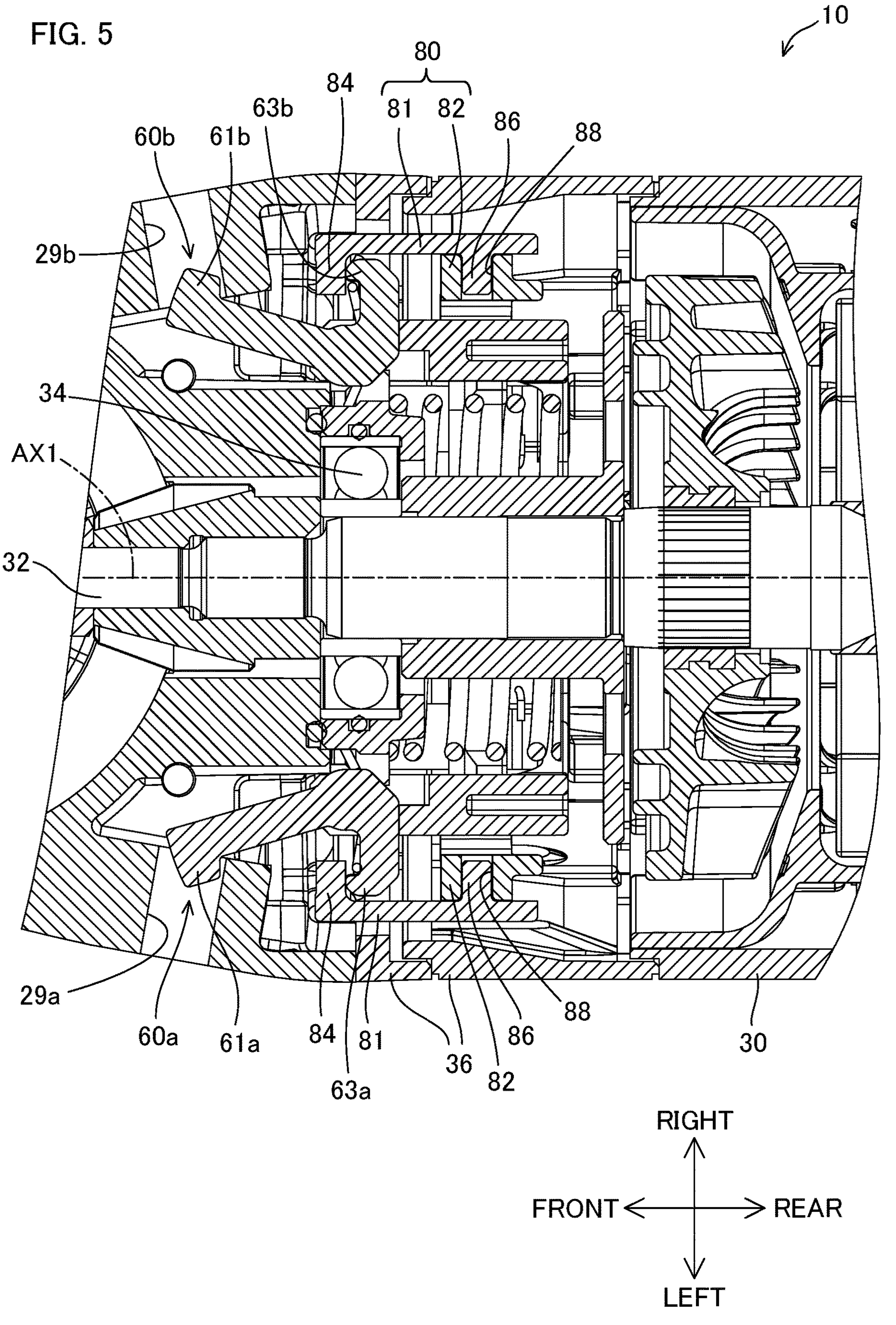
FIG. 5 is a partial enlarged view of FIG. 2.
Figure 7:
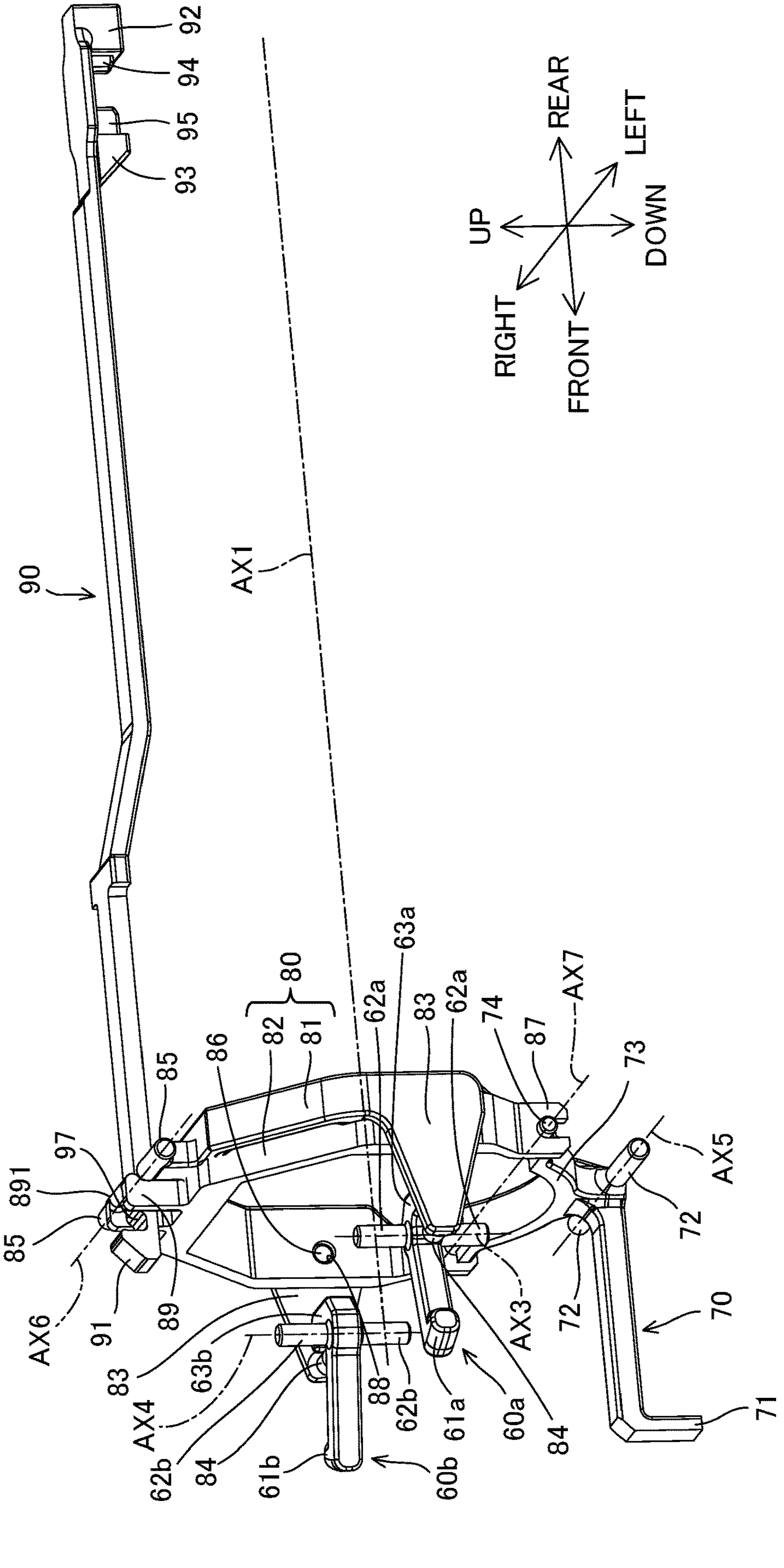
FIG. 7 is a perspective view of the assembly illustrated in FIG. 6.
Figure 8:
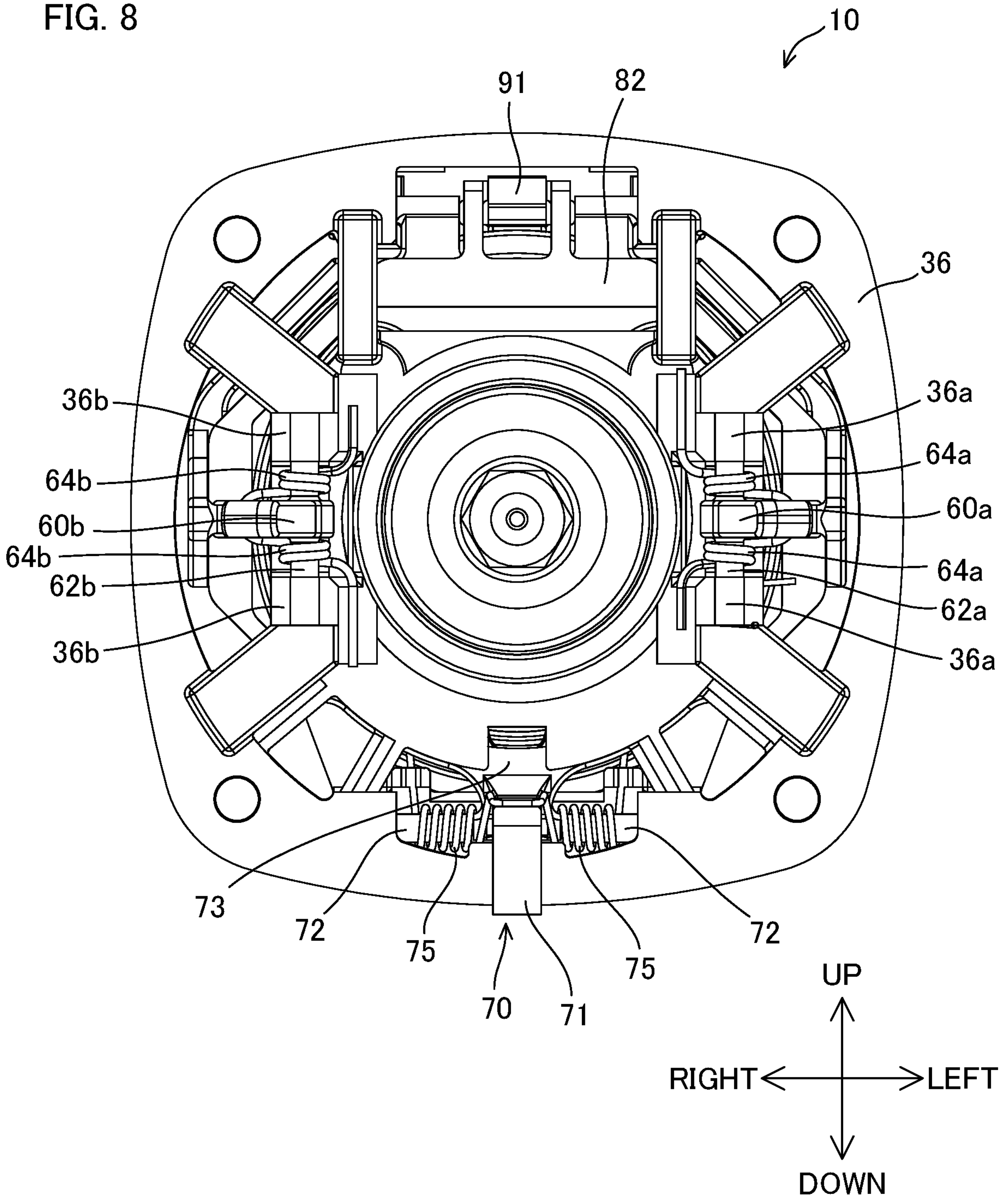
FIG. 8 is a front view illustrating the inner structure of the grinder, and each of the members in the assembly illustrated in FIG. 6 is located at the initial position.
Figure 9:
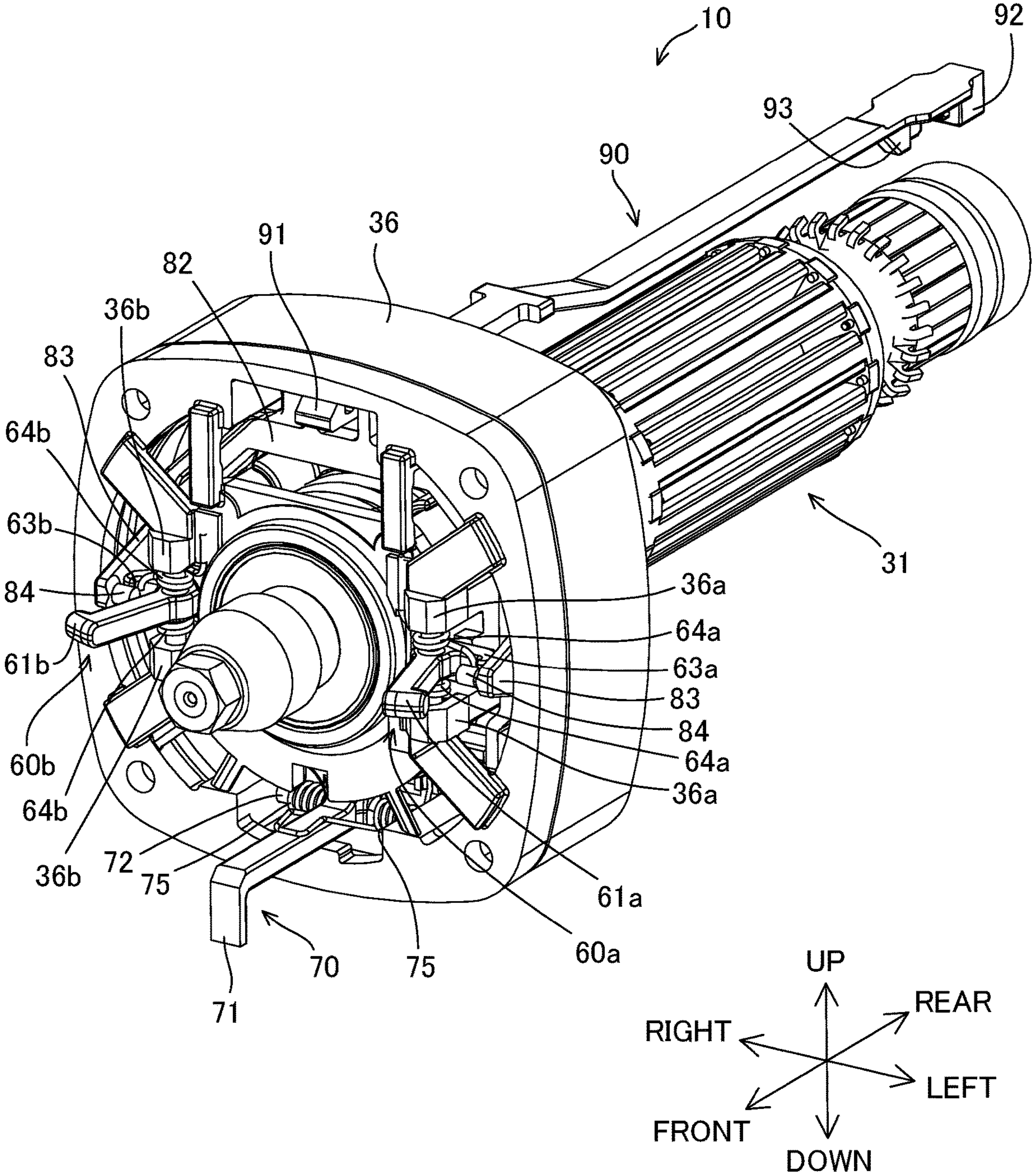
FIG. 9 is a perspective view illustrating the inner structure of the grinder, and each of the members in the assembly illustrated in FIG. 6 is located at the initial position.

The grinder 10 includes first intermediate members 60*a* and 60*b*, a second intermediate member 70, a first interlock member 80, a second interlock member 90, and a sensor 44. As illustrated in FIGS. 5, 7, and 9, the first intermediate members 60*a* and 60*b* are shaped identically to each other. The first intermediate member 60*a* is a member having a rod-like portion extending in a direction slightly angled with respect to the rotational axis AX1. More precisely, the first intermediate member 60*a* extends so as to be separating from the rotational axis AX1 from the rear end thereof toward the front end thereof. A protrusion portion 61*a*, which protrudes outward in the radial direction with respect to the rotational axis AX1, is formed at the front end of the rod-like portion of the first intermediate member 60*a*. A pressing portion 63*a*, which protrudes in a claw-like manner outward in the radiation direction, is formed at the rear end of the rod-like portion of the first intermediate member 60*a*. Columnar shaft portions 62*a*, which protrude toward the upper side and the lower side, respectively, are formed near the rear end of the first intermediate member 60*a* (refer to FIG. 7). As illustrated in FIGS. 8 and 9, the shaft portions 62*a* are supported in bosses 36*a* formed in the intermediate housing 36, and the first intermediate member 60*a* is pivotal about a first pivotal axis AX3 (refer to FIG. 7). Similarly, the first intermediate member 60*b* includes a protrusion portion 61*b*, a pressing portion 63*b*, and shaft portions 62*b*. The shaft portions 62*b* are supported in bosses 36*b* formed in the intermediate housing 36, and the first intermediate member 60*b* is pivotal about a second pivotal axis AX4 (refer to FIG. 7). The first pivotal axis AX3 and the second pivotal axis AX4 are in parallel with each other, and both extend in the vertical direction.

As illustrated in FIGS. 8 and 9, torsion springs 64*a* are disposed around the shaft portions 62*a* of the first intermediate member 60*a*. Similarly, torsion springs 64*b* are disposed around the shaft portions 62*b* of the first intermediate member 60*b*. The torsion springs 64*a* bias the first intermediate member 60*a* in the counterclockwise direction as viewed from above (i.e., a direction for displacing the protrusion portion 61*a* rearward). The torsion springs 64*b* bias the first intermediate member 60*b* in the clockwise direction as viewed from above (i.e., a direction for displacing the protrusion portion 61*b* rearward).

As illustrated in FIG. 5, the first intermediate members 60*a* and 60*b* are disposed adjacent to the first attachment portions 29*a* and 29*b*, respectively. The first intermediate members 60*a* and 60*b* are disposed so as to be symmetric with each other with respect to the plane P1 (refer to FIGS. 2 and 11). When the first intermediate members 60*a* and 60*b* are located at initial positions illustrated in FIG. 5, the protrusion portions 61*a* and 61*b* located at the front ends of the first intermediate members 60*a* and 60*b* are contained in the first attachment portions 29*a* and 29*b*, respectively.

As illustrated in FIGS. 1, 7, and 9, the second intermediate member 70 is a member having a rod-like portion extending in the front-rear direction. A pressed portion 71, which protrudes downward, is formed at the front end of the rod-like portion of the second intermediate member 70. As illustrated in FIG. 7, columnar shaft portions 72, which protrude to the right side and the left side, respectively, are formed at the rear end of the rod-like portion of the second intermediate member 70. Further, an arched portion 73, which extends upward in an arched manner, is formed at the rear end of the rod-like portion of the second intermediate member 70. The arched portion 73 has a shape symmetric in the left-right direction with respect to the rotational axis AX1. Columnar engagement portions 74, which protrude to the right side and the left side, respectively, are formed at both the ends of the arched portion 73 (only the engagement portion 74 on the left side can be seen in FIG. 7).

As illustrated in FIGS. 1, 9, and 10, the second intermediate member 70 is disposed near the bottom portion of the intermediate housing 36 in such a manner that an approximately half portion on the rear side thereof is contained in the intermediate housing 36. An approximately half portion on the front side of the second intermediate member 70 extends out of a hole of the intermediate housing 36 forward and is exposed. The pressed portion 71 located at the front end of the second intermediate member 70 is positioned near the second attachment portion 22 of the gear housing 20.

The distal ends of the shaft portions 72 of the second intermediate member 70 are supported in bosses (not illustrated) formed in the intermediate housing 36, and the second intermediate member 70 is pivotal about a third pivotal axis AX5 extending in the left-right direction (refer to FIG. 7). As illustrated in FIGS. 8 and 9, torsion springs 75 are disposed around the shaft portions 72 of the second intermediate member 70. The torsion springs 75 bias the second intermediate member 70 in the counterclockwise direction as viewed from the left side (i.e., a direction for displacing the pressed portion 71 downward).

The first interlock member 80 is a member configured to mechanically move in conjunction with both the first intermediate member 60*a* or 60*b* and the second intermediate member 70 (the details thereof will be described below). As illustrated in FIG. 7, the first interlock member 80 includes two members, i.e., a first member 81 and a second member 82 in the present embodiment. The first member 81 is a generally U-shaped member opened on the lower side thereof. Two lower end portions 83 of the first member 81 protrude forward. The lower end portions 83 are located at the same positions as the first intermediate members 60*a* and 60*b* in the vertical direction. The lower end portions 83 each have a tapering shape reducing in width toward the front side in such a manner that the center of gravity of the first member 81 is located at a position closer to the rear end than to the front end thereof.

As illustrated in FIGS. 7 and 9, a pressed portion 84, which protrudes from the lower end portion 83 inward in the radial direction with respect to the rotational axis AX1, is formed at the front edge of each of the two lower end portions 83. The pressed portion 84 has a columnar shape in the present embodiment. The pressed portions 84 are located adjacent to the pressing portions 63*a* and 63*b* in front of the pressing portions 63*a* and 63*b* of the first intermediate members 60*a* and 60*b*, respectively. As illustrated in FIG. 5, when the first intermediate members 60*a* and 60*b* are located at the initial positions, the pressing portions 63*a* and 63*b* and the two pressed portions 84 are in contact with each other in the front-rear direction, respectively, but the pressing portions 63*a* and 63*b* are in a state of not pressing the two pressed portions 84 forward (referred to as a non-pressing state).

As illustrated in FIGS. 5 and 7, an engagement portion 86, which protrudes from the lower end portion 83 inward in the radial direction with respect to the rotational axis AX1, is further formed at each of the two lower end portions 83. The engagement portion 86 is located on the rear side with respect to the pressed portion 84. The engagement portion 86 has a columnar shape in the present embodiment.

Columnar shaft portions 85, which protrude toward the left side and the right side, respectively, are formed at the upper end portion of the first member 81. The distal ends of the shaft portions 85 are supported in bosses (not illustrated) formed in the intermediate housing 36, and the first member 81 is pivotal about a fourth pivotal axis AX6 extending in the left-right direction (refer to FIG. 7).

Figure 14:
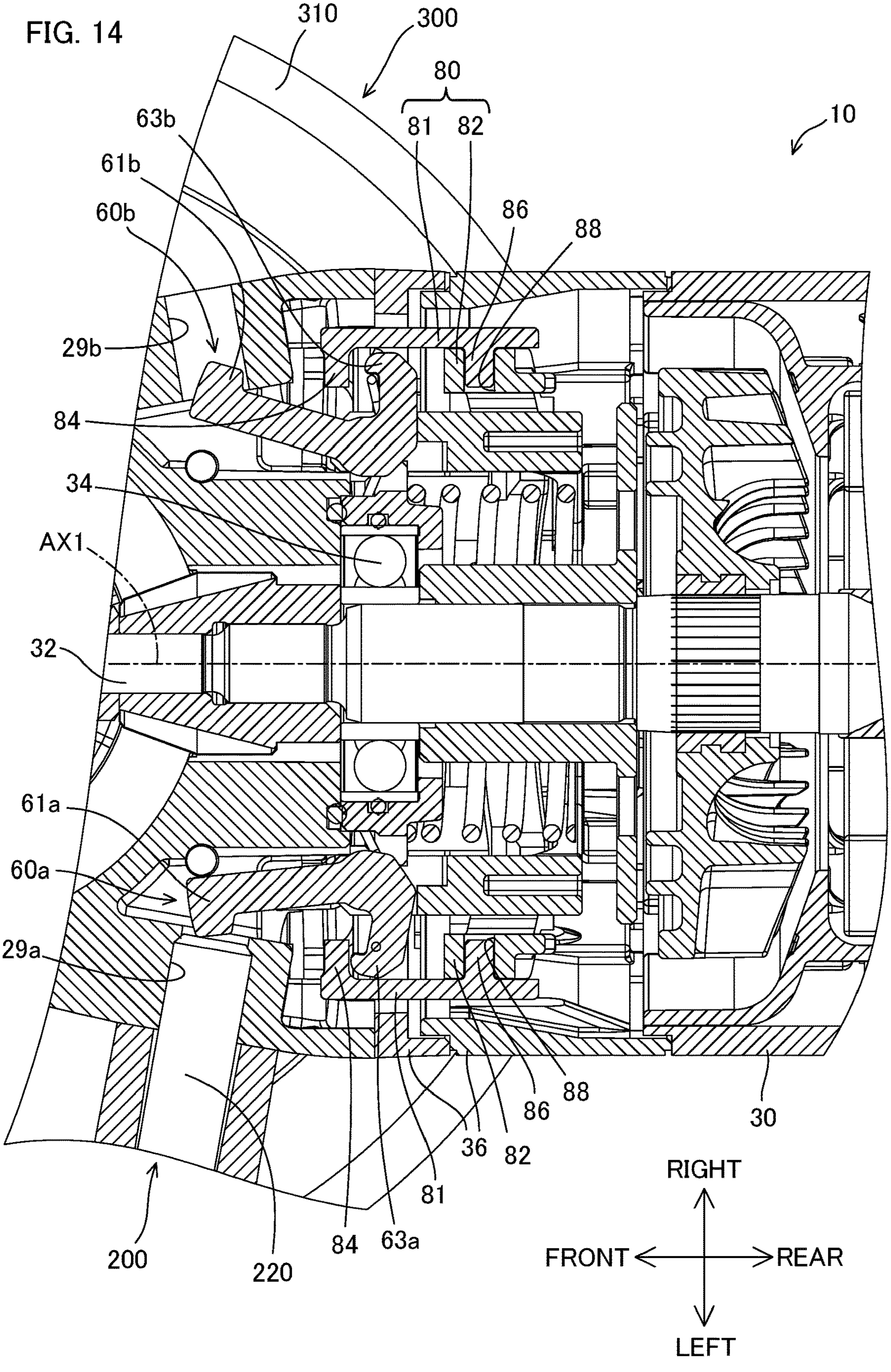
FIG. 14 is a partial enlarged view of FIG. 11.

This first member 81 is configured mechanically move in conjunction with the first intermediate member 60*a* or 60*b*. More specifically, when the side handle 200 is attached to the first attachment portion 29*a* as illustrated in FIG. 14, the distal end of the attachment portion 220 of the side handle 200 presses the protrusion portion 61*a* of the first intermediate member 60*a* inward. According thereto, the first intermediate member 60*a* moves pivotally from the initial position illustrated in FIG. 5 to a position illustrated in FIG. 14 in the clockwise direction as viewed from above against the biasing forces of the torsion springs 64*a*. At this time, the pressing portion 63*a* of the first intermediate member 60*a* presses the left-side pressed portion 84 of the first member 81 forward while moving pivotally as illustrated in FIG. 14. As a result, the first member 81 moves pivotally about the fourth pivotal axis AX6 located on the shaft portions 85 from a position illustrated in FIGS. 6 and 7 to a position illustrated in FIGS. 15 and 16 forward (i.e., in such a manner that the lower end portion 83 is displaced forward).

On the other hand, when the side handle 200 is detached from the first attachment portion 29*a*, i.e., the grinder 10 returns to the state that the side handle 200 does not press the protrusion portion 61*a* of the first intermediate member 60*a*, the first intermediate member 60*a* returns from the position illustrated in FIG. 14 to the initial position illustrated in FIG. 5 by moving pivotally in the counterclockwise direction as viewed from above under the biasing forces of the torsion springs 64*a*. At this time, the first member 81 returns from the position illustrated in FIGS. 15 and 16 to the position illustrated in FIGS. 6 and 7 under a biasing force of a not-illustrated biasing member provided in the intermediate housing 36.

When the side handle 200 is attached to the first attachment portion 29*b*, the distal end of the attachment portion 220 of the side handle 200 presses the protrusion portion 61*b* of the first intermediate member 60*b* inward, and the first intermediate member 60*b* moves pivotally in the counterclockwise direction as viewed from above (i.e., in the opposite direction from when the side handle 200 is attached to the first attachment portion 29*a* and the first intermediate member 60*a* is pressed by the side handle 200) against the biasing forces of the torsion springs 64*b*, although this is not illustrated. At this time, the pressing portion 63*b* of the first intermediate member 60*b* presses the right-side pressed portion 84 of the first member 81 forward while moving pivotally. As a result, the first member 81 moves forward pivotally about the fourth pivotal axis AX6 located on the shaft portions 85 similarly to when the side handle 200 is attached to the first attachment portion 29*a*. Further, when the side handle 200 is detached from the first attachment portion 29*b*, the first intermediate member 60*b* and the first member 81 return to the respective initial positions similarly.

In this manner, the first member 81 is configured to move in conjunction with the first intermediate member 60*a* or the first intermediate member 60*b* by being pressed by the first intermediate member 60*a* or the first intermediate member 60*b* when the side handle 200 is selectively attached to any of the first attachment portions 29*a* and the 29*b*.

As illustrated in FIG. 7, the second member 82 is a generally U-shaped member opened on the lower side thereof. As illustrated in FIGS. 5 and 7, the second member 82 is disposed on the radially inner side with respect to the first member 81. As illustrated in FIG. 7, the second member 82 includes, on the upper end thereof, a protrusion upper end portion 89 which protrude upward. The protrusion upper end portion 89 includes a right-side side wall and a left-side side wall. The protrusion upper end portion 89 further includes a beam portion 891, which connects the right-side side wall and the left-side side wall at upper and rear positions of them. The beam portion 891 has a columnar shape extending in the left-right direction. A through-hole 892 extending in the front-rear direction (refer to FIGS. 3 and 12) is formed below the beam portion 891. The two lower ends of the second member 82 extend to the lower side with respect to the lower end portions 83 of the first member 81. An engagement portion 87, which includes a generally U-shaped cutout opened on the lower side, is formed at each of the two lower ends of the second member 82. The two engagement portions 74 of the second intermediate member 70 are inserted in the cutouts of the two engagement portions 87, respectively. Due to this configuration, the second member 82 and the second intermediate member 70 are engaged with each other.

Figure 12:
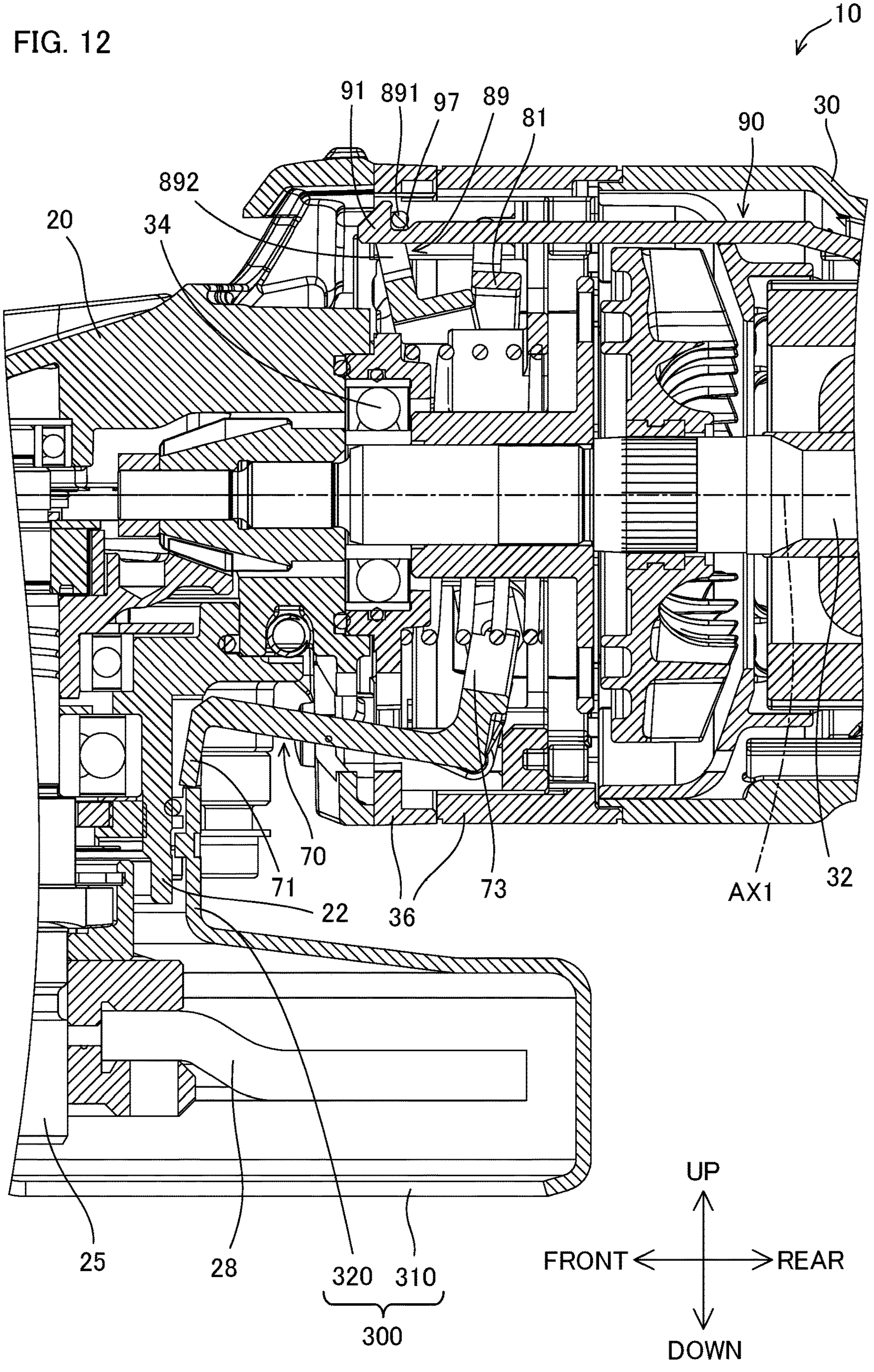
FIG. 12 is a partial enlarged view of FIG. 10.

The second member 82 is configured to mechanically move in conjunction with the second intermediate member 70 and the first member 81. First, the interlocking movement between the second member 82 and the second intermediate member 70 will be described. As illustrated in FIGS. 10 and 12, when the cover 300 (more specifically, the attachment portion 320) is attached to the second attachment portion 22, the upper end of the attachment portion 320 presses the pressed portion 71 of the second intermediate member 70 upward. According thereto, the second intermediate member 70 moves pivotally about the third pivotal axis AX5 located on the shaft portions 72 from a position illustrated in FIGS. 6 and 7 to a position illustrated in FIGS. 17 and 18 in the clockwise direction as viewed from the left side against the biasing forces of the torsion springs 75. At this time, the engagement portions 87 engaged with the engagement portions 74 of the second intermediate member 70 are pressed rearward, and the second member 82 moves pivotally about a fifth pivotal axis AX7 (refer to FIG. 7) located on the engagement portions 74 from a position illustrated in FIGS. 6 and 7 to a position illustrated in FIGS. 17 and 18 in the counterclockwise direction as viewed from the left side.

Figure 6:
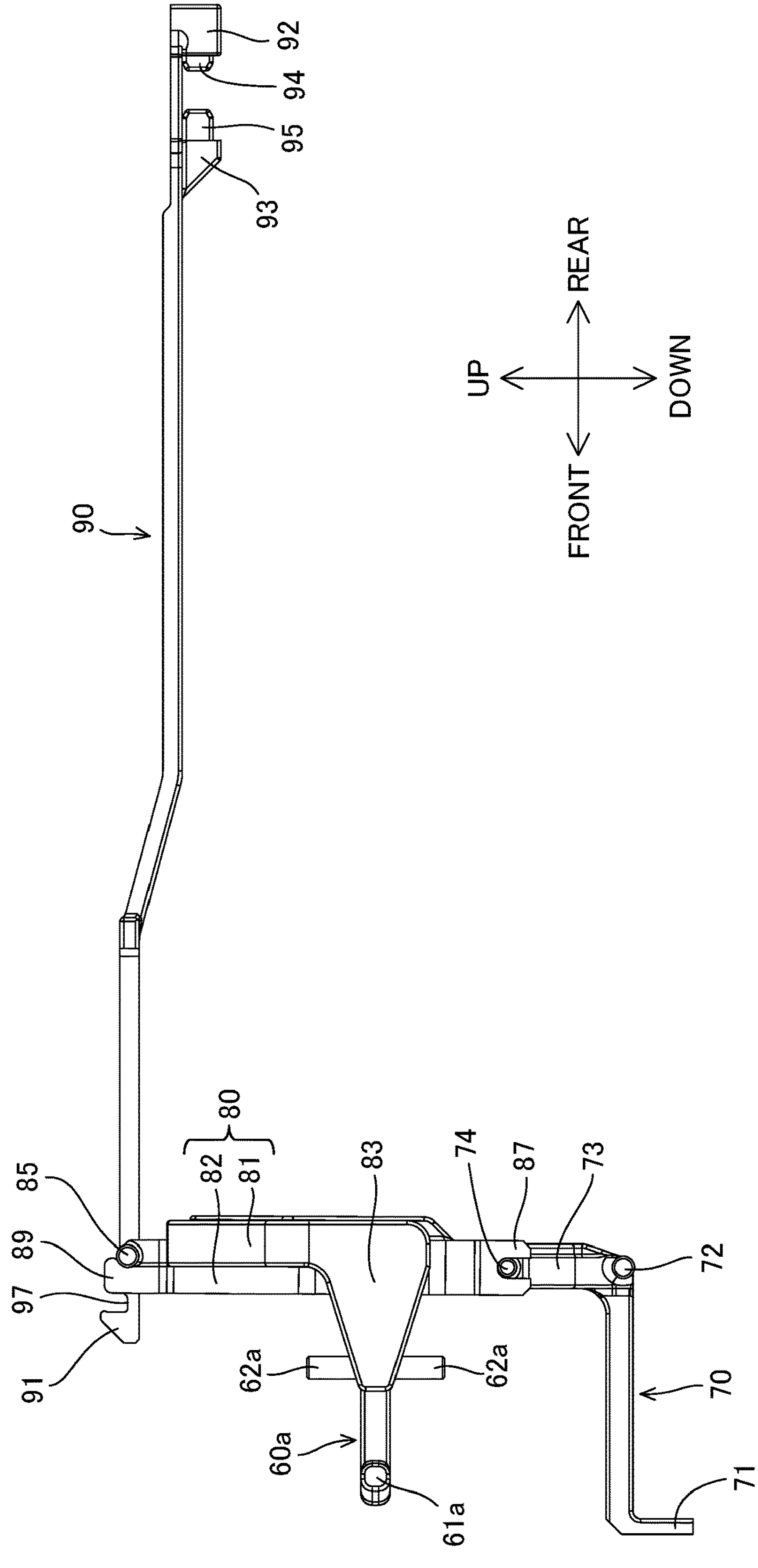
FIG. 6 is a side view illustrating an assembly including a first intermediate member, a second intermediate member, a first interlock member, and a second interlock member, and each of the members is located at an initial position.
Figure 17:
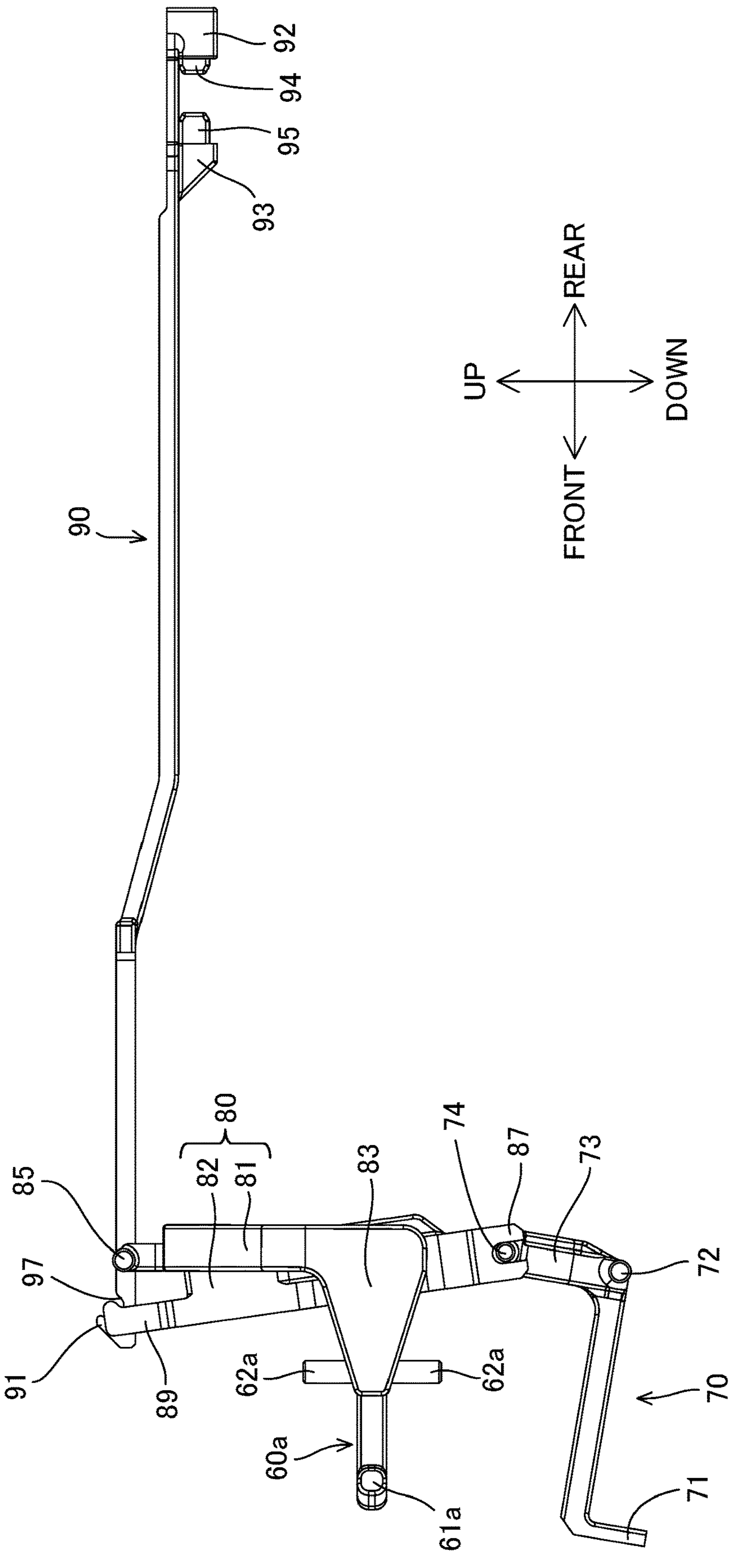
FIG. 17 is a side view illustrating the assembly with only the cover attached.
Figure 18:
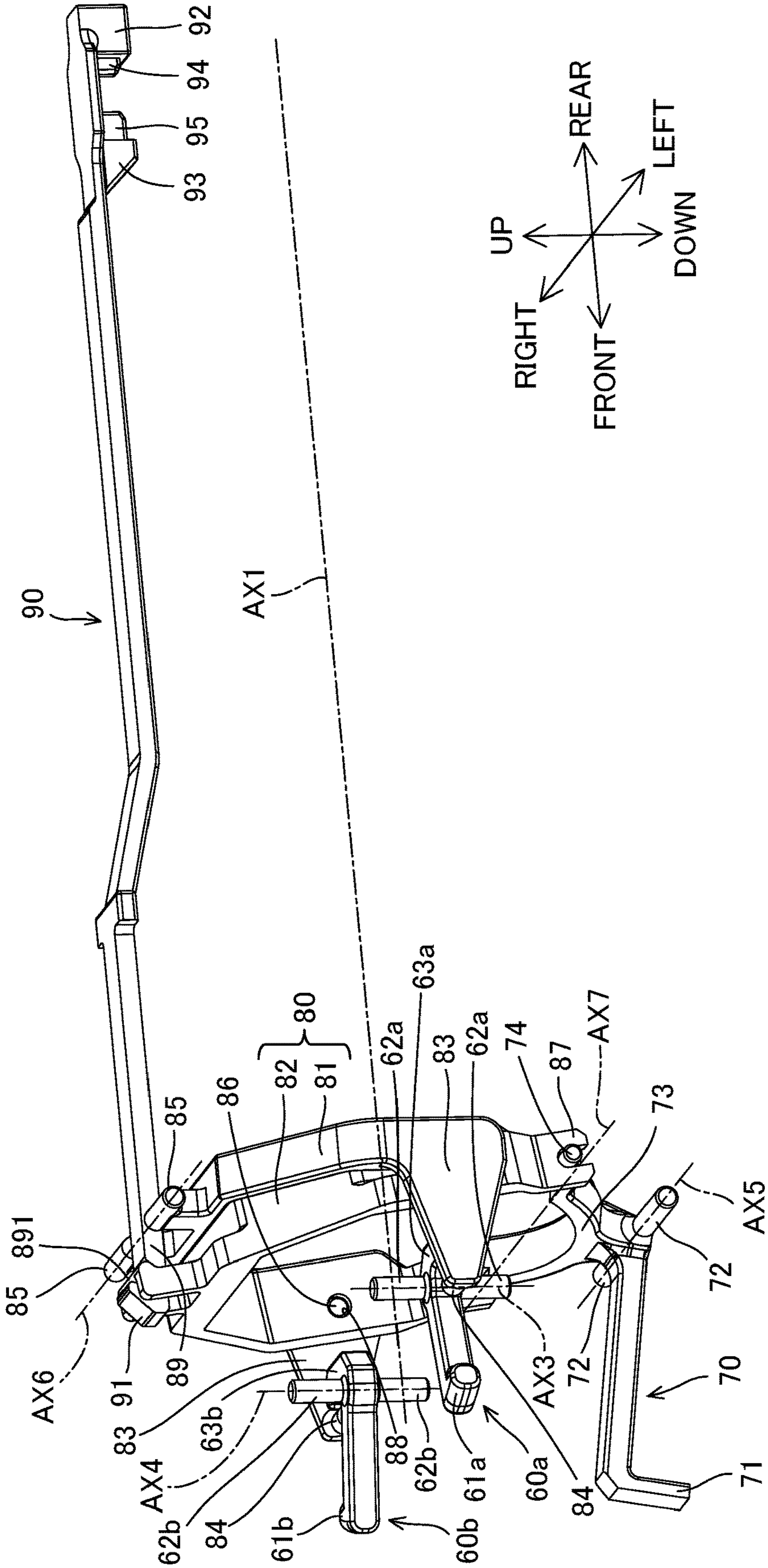
FIG. 18 is a perspective view of the assembly illustrated in FIG. 17.

On the other hand, when the cover 300 is detached from the second attachment portion 22, i.e., the grinder 10 returns to the state that the cover 300 does not press the pressed portion 71 of the second intermediate member 70, the second intermediate member 70 returns from the position illustrated in FIGS. 17 and 18 to the position illustrated in FIGS. 6 and 7 by moving pivotally in the counterclockwise direction as viewed from the left side under the biasing forces of the torsion springs 75. At this time, the engagement portions 87 of the second member 82 engaged with the engagement portions 74 of the second intermediate member 70 are pressed forward, and therefore the second member 82 also moves pivotally and returns from the position illustrated in FIGS. 17 and 18 to the position illustrated in FIGS. 6 and 7.

In this manner, the second member 82 is configured to move in conjunction with the second intermediate member 70 by being pressed by the second intermediate member 70 when the cover 300 is attached to the second attachment portion 22.

Next, the interlocking movement between the second member 82 and the first member 81 will be described. As illustrated in FIGS. 5 and 7, two engagement holes 88 are formed at vertically extending portions of the second member 82 on the left side and the right side sandwiching the rotational axis AX1 therebetween (hereinafter referred to as a left portion and a right portion), respectively (only the engagement hole 88 on the right side can be seen in FIG. 7). The two engagement holes 88 are configured in the form of holes extending through the left portion and the right portion in the left-right direction, respectively. The engagement holes 88 are located at positions closer to the engagement portions 74 of the second intermediate member 70 than the shaft portions 85 of the first member 81 are. The engagement portions 86 of the first interlock member 80 are inserted in the two engagement holes 88, respectively. Due to this configuration, the second member 82 and the first member 81 are engaged with each other.

Therefore, when the first member 81 moves pivotally about the fourth pivotal axis AX6 by being pressed by the first intermediate member 60*a* or the first intermediate member 60*b* due to the attachment of the side handle 200, the engagement portions 86 press the second member 82 forward. As a result, the second member 82 moves pivotally about the fifth pivotal axis AX7 extending in the left-right direction (refer to FIG. 7) from the position illustrated in FIGS. 6 and 7 to a position illustrated in FIGS. 15 and 16. The fifth pivotal axis AX7 is located on the engagement portions 74. Further, when the side handle 200 is detached and the first member 81 moves pivotally in the opposite direction, the engagement portions 86 press the second member 82 rearward. As a result, the second member 82 moves pivotally and returns from the position illustrated in FIGS. 15 and 16 to the position illustrated in FIGS. 6 and 7.

Further, when the second intermediate member 70 moves pivotally due to the attachment of the cover 300, and the second member 82 moves pivotally in the counterclockwise direction as viewed from the left side in conjunction with the second intermediate member 70, the second member 82 presses the engagement portions 86 of the first member 81 forward. According thereto, the first member 81 moves pivotally about the fourth pivotal axis AX6 located on the shaft portions 85 from the position illustrated in FIGS. 6 and 7 to a position illustrated in FIGS. 17 and 18 in the clockwise direction as viewed from the left side. Further, when the cover 300 is detached and the second member 82 moves pivotally in the opposite direction, the second member 82 presses the engagement portions 86 rearward. As a result, the first member 81 moves pivotally and returns from the position illustrated in FIGS. 17 and 18 to the position illustrated in FIGS. 6 and 7.

Due to such a configuration, the second member 82 can move in conjunction with both the second intermediate member 70 and the first member 81. As clearly understood from the above description, the second member 82 is displaced in the same direction between when the side handle 200 is attached and when the cover 300 is attached.

The above-described interlocking movements of the first intermediate member 60*a* or 60*b*, the second intermediate member 70, and the first interlock member 80 (the first member 81 and the second member 82) realize a cumulative displacement of the first interlock member 80 when both the side handle 200 and the cover 300 are attached. More specifically, when the side handle 200 is attached first, the first interlock member 80 is displaced (moves pivotally) from the initial position illustrated in FIGS. 6 and 7 to the position illustrated in FIGS. 15 and 16 as described above. Then, when the cover 300 is attached in addition to the side handle 200, the first interlock member 80 is further displaced (moves pivotally) from the position illustrated in FIGS. 15 and 16 to a position illustrated in FIGS. 19 and 20 in the same direction as when the side handle 200 is attached. On the other hand, when the side handle 300 is attached first, the first interlock member 80 is displaced (moves pivotally) from the initial position illustrated in FIGS. 6 and 7 to the position illustrated in FIGS. 17 and 18 as described above. Then, when the side handle 200 is attached in addition to the cover 300, the first interlock member 80 is further displaced (moves pivotally) from the position illustrated in FIGS. 17 and 18 to the position illustrated in FIGS. 19 and 20 in the same direction as when the cover 300 is attached. In this manner, when both the side handle 200 and the cover 300 are attached, the first interlock member 80 is cumulatively displaced from the initial position illustrated in FIGS. 6 and 7 to the position illustrated in FIGS. 19 and 20 regardless of the order in which the side handle 200 and the cover 300 are attached.

Figure 3:
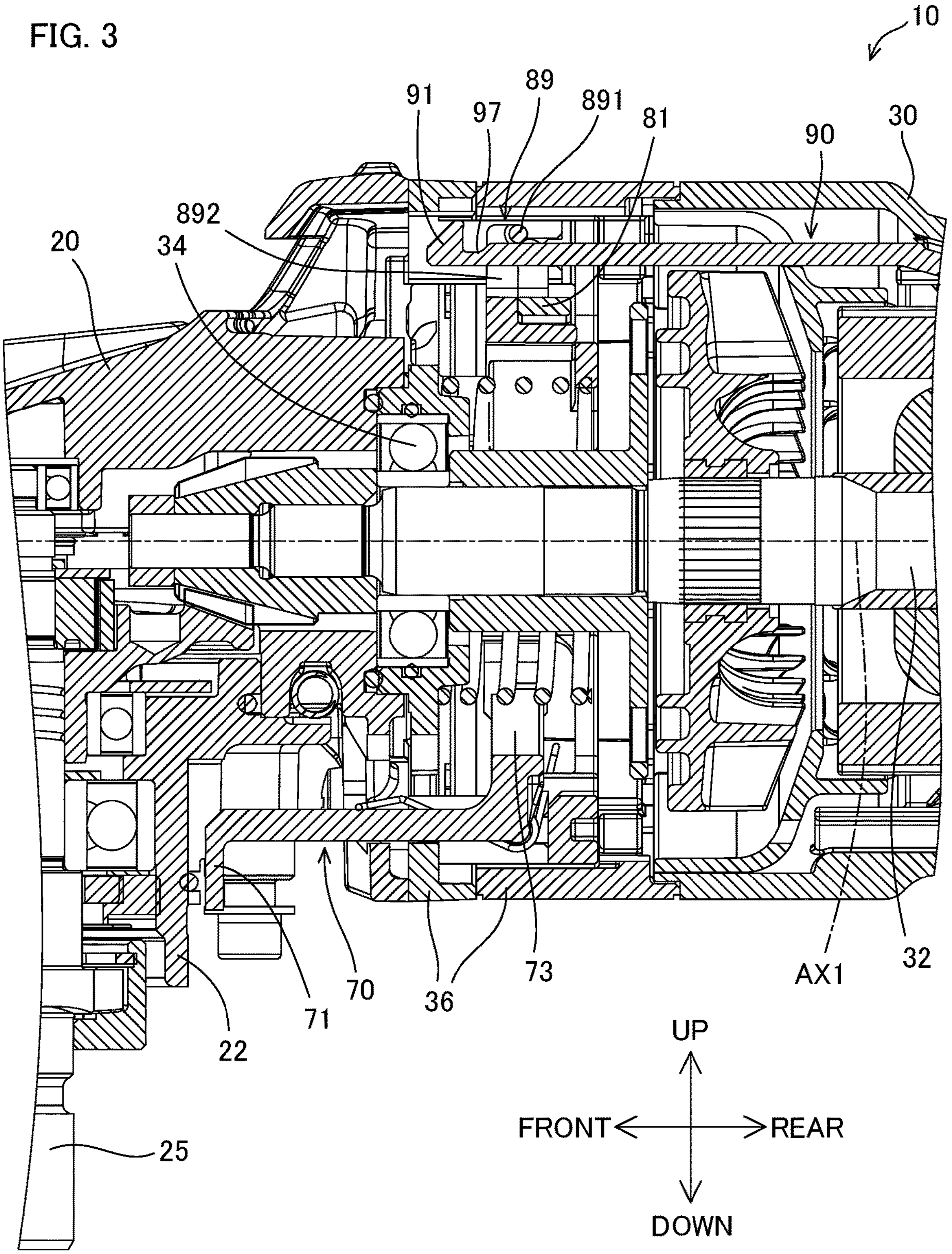
FIG. 3 is a partial enlarged view of FIG. 1.

The second interlock member 90 is configured to mechanically move in conjunction with such a cumulative displacement of the first interlock member 80. As illustrated in FIGS. 6 and 7, the second interlock member 90 is a rod-like member extending in the front-rear direction. As illustrated in FIGS. 1 and 10, the second interlock member 90 extends from the front side with respect to the electric motor 31 to the rear side with respect to the electric motor 31. The second interlock member 90 is disposed along the inner upper surface of the motor housing 30 displaceably in the front-rear direction. As illustrated in FIGS. 3 and 12, the second interlock member 90 extends through the through-hole 892 formed on the protrusion upper end portion 89 of the second member 82 of the first interlock member 80 and extends to the front side with respect to the second member 82.

As illustrated in FIGS. 6 and 7, an engagement portion 91, which protrudes upward, is formed at the front end of the second interlock member 90. The engagement portion 91 extends to the upper side with respect to the beam portion 891 of the protrusion upper end portion 89. A recessed portion 97, which is recessed in a circular-arc manner, is formed at the proximal portion of the rear side of the engagement portion 91. Protrusion portions 92 and 93 are formed near the rear end of the second interlock member 90. The protrusion portions 92 and 93 protrude downward, and are spaced apart from each other in the front-rear direction. A positioning protrusion portion 94, which protrudes forward, is formed on the front end surface of the protrusion portion 92. A positioning protrusion portion 95, which protrudes rearward, is formed on the rear end surface of the protrusion portion 93.

Figure 4:
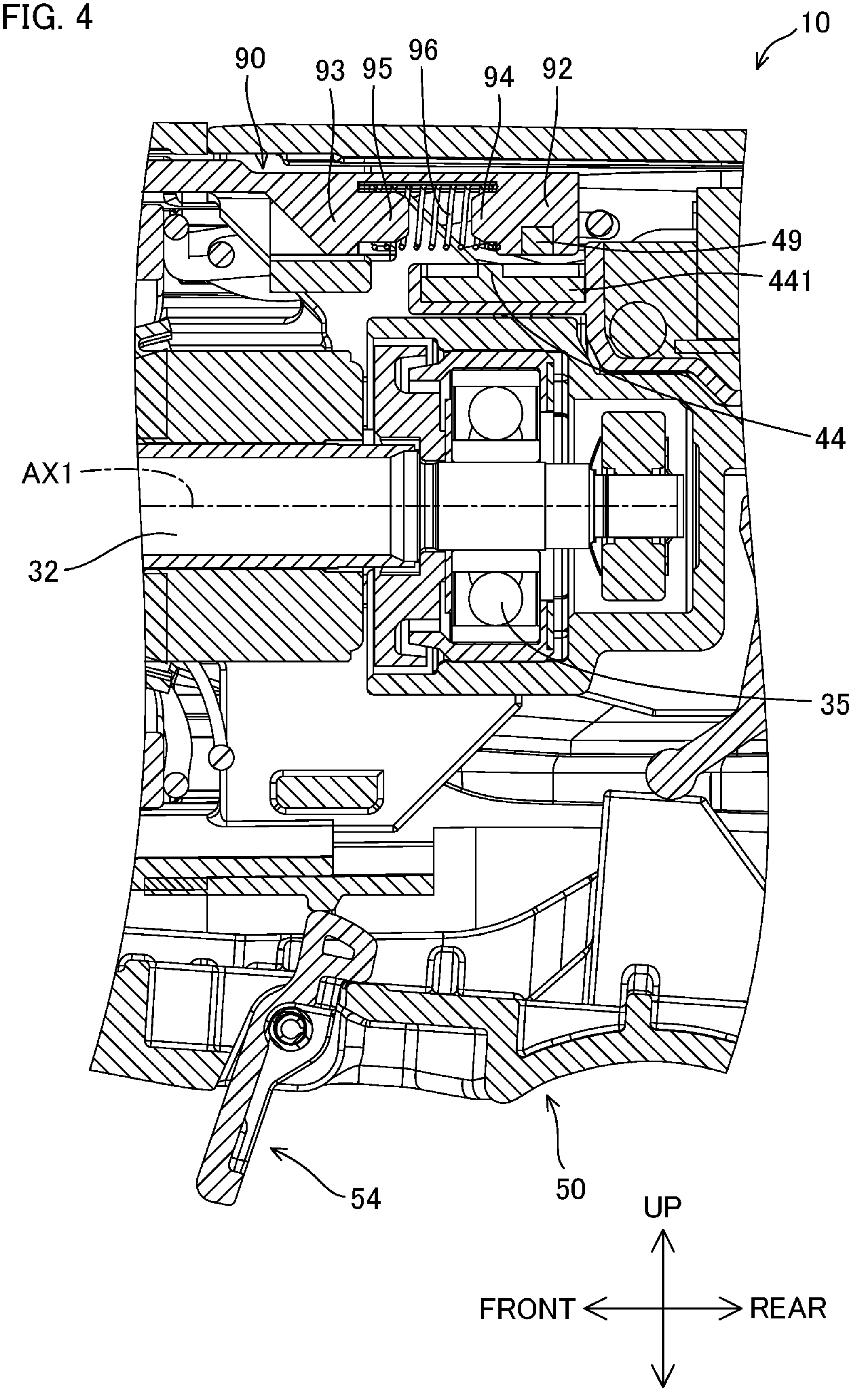
FIG. 4 is a partial enlarged view of FIG. 1.
Figure 13:
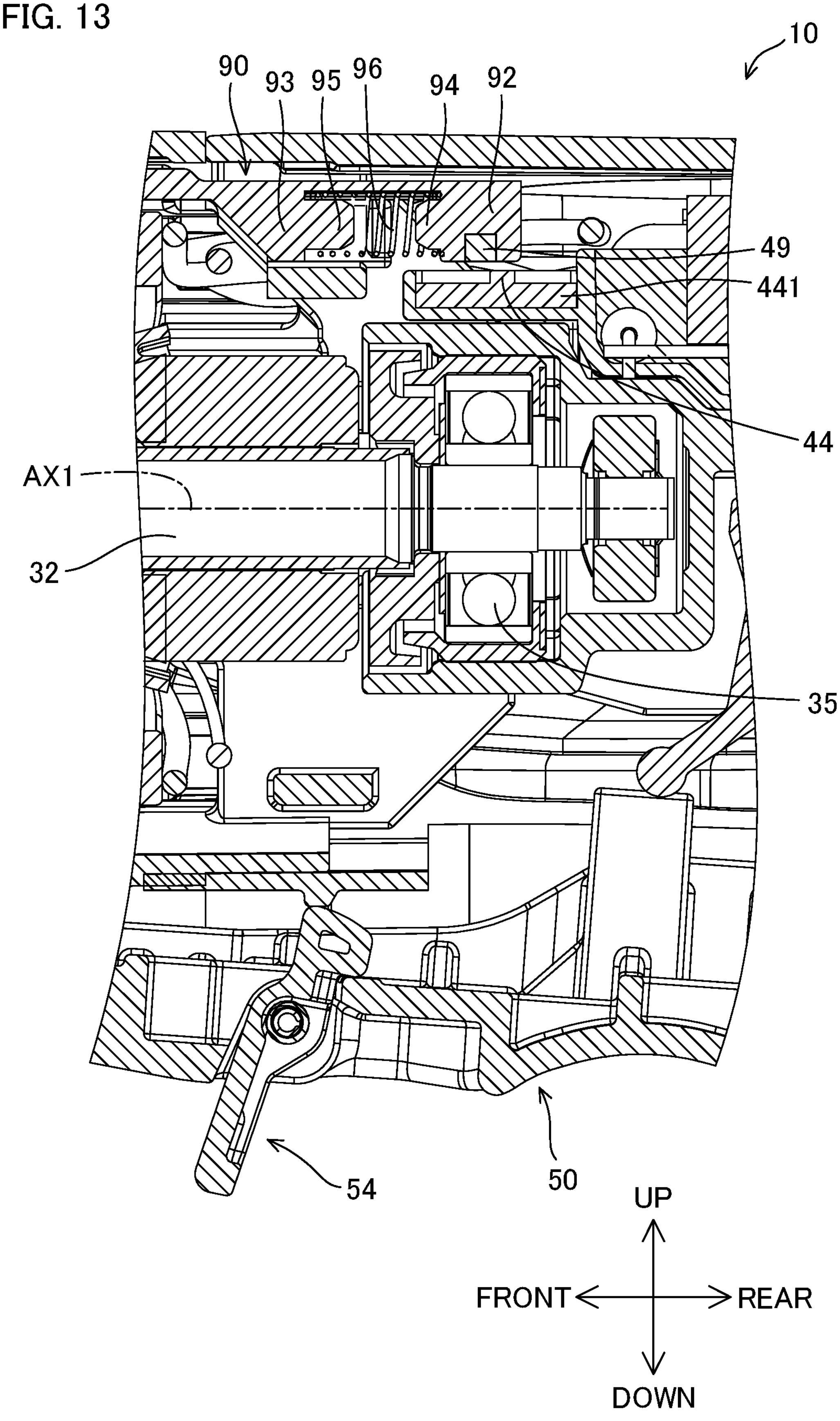
FIG. 13 is a partial enlarged view of FIG. 10.

As illustrated in FIGS. 4 and 13, a coil spring 96 as one example of a biasing member is disposed between the protrusion portion 92 and the protrusion portion 93. The rear end of the coil spring 96 is seated on the front end surface of the protrusion portion 92, and the front end of the coil spring 96 is seated on a portion of the motor housing 30 that hangs out between the protrusion portion 92 and the protrusion portion 93. The coil spring 96 is disposed so as to surround the positioning protrusion portions 94 and 95, and a movement of the coil spring 96 in a direction perpendicular to the front-rear direction is restricted thereby. The coil spring 96 is disposed in a compressed state, and constantly biases the second interlock member 90 rearward. The protrusion portion 93 functions as a stopper that restricts a rearward movement of the second interlock member 90 by abutting against the portion of the motor housing 30 that hangs out between the protrusion portion 92 and the protrusion portion 93.

Figure 15:
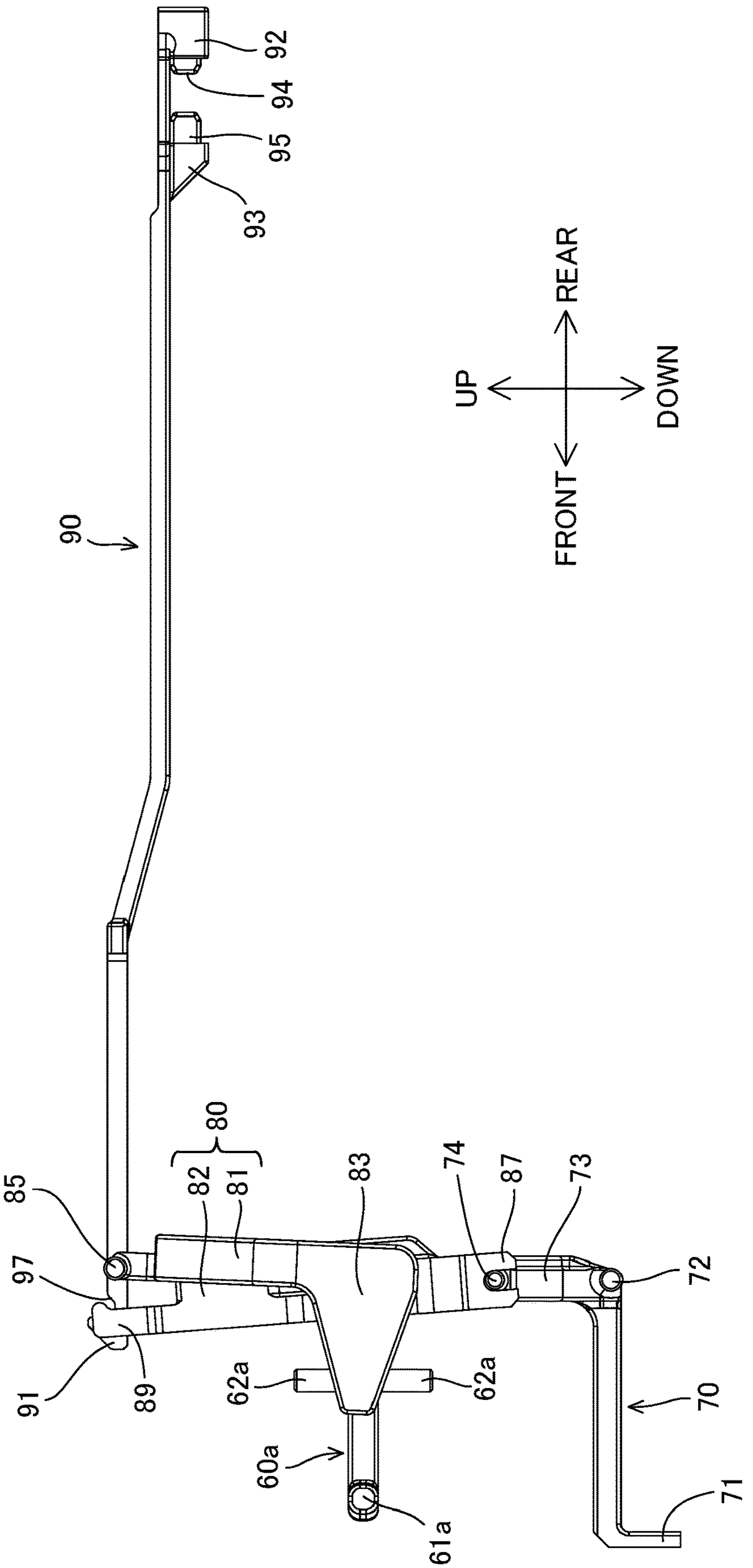
FIG. 15 is a side view illustrating the assembly with only the side handle attached.
Figure 16:
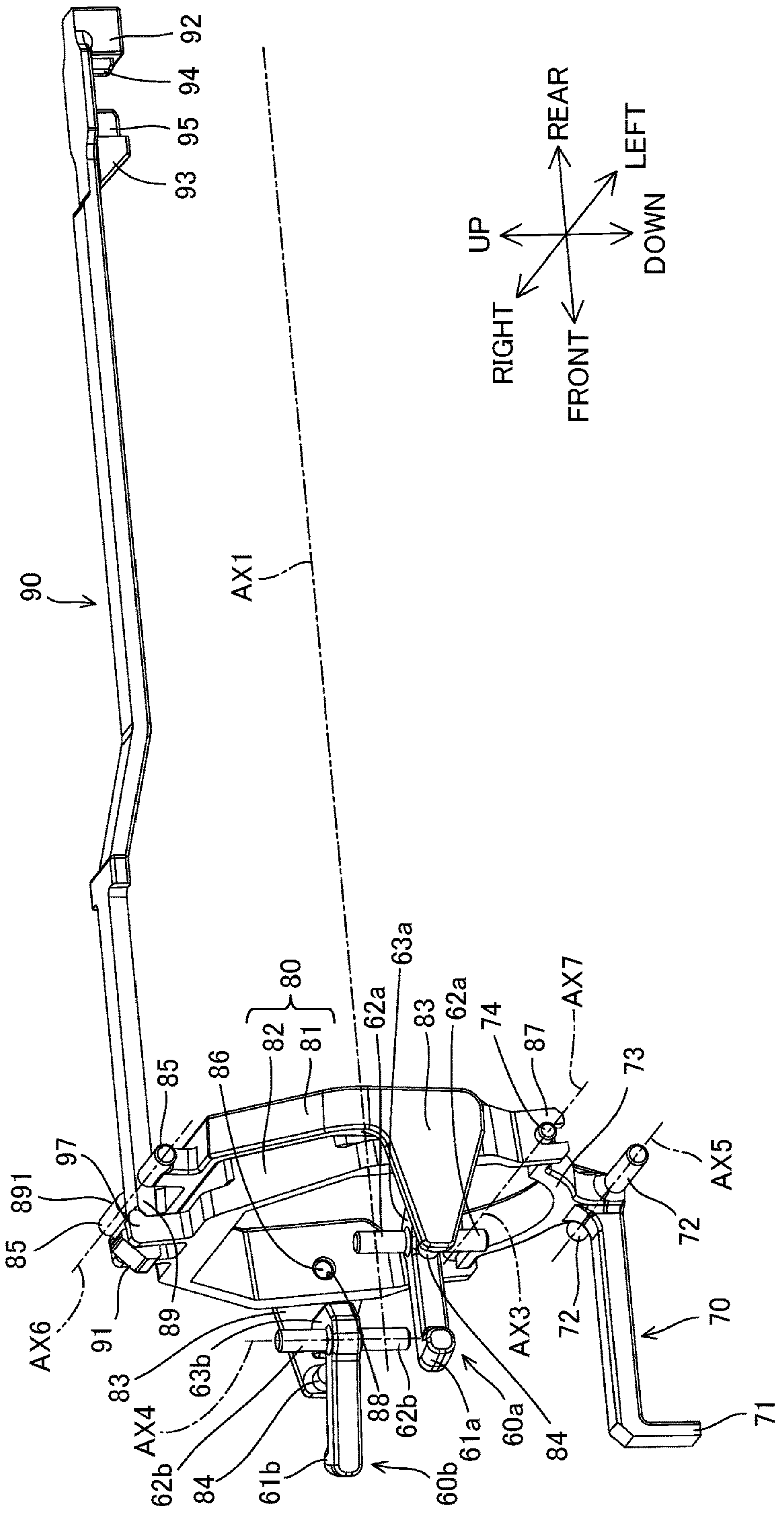
FIG. 16 is a perspective view of the assembly illustrated in FIG. 15.

When the second interlock member 90 is located at an initial position illustrated in FIGS. 6 and 7, the engagement portion 91 of the second interlock member 90 and the beam portion 891 of the second member 82 are spaced apart from each other in the front-rear direction. When only the side handle 200 as one of the side handle 200 and the cover 300 is attached, the engagement portion 91 and the beam portion 891 of the second member 82 contact each other as illustrated in FIGS. 15 and 16 due to the pivotal movement of the second member 82 of the first interlock member 80. At this time, the beam portion 891 does not press the engagement portion 91 forward. Therefore, the second interlock member 90 stays at the initial position. When only the cover 300 as one of the side handle 200 and the cover 300 is attached, the engagement portion 91 and the beam portion 891 of the second member 82 contact each other as illustrated in FIGS. 17 and 18 due to the pivotal movement of the second member 82 of the first interlock member 80. At this time, the beam portion 891 does not press the engagement portion 91 forward. Therefore, the second interlock member 90 stays at the initial position.

Figure 19:
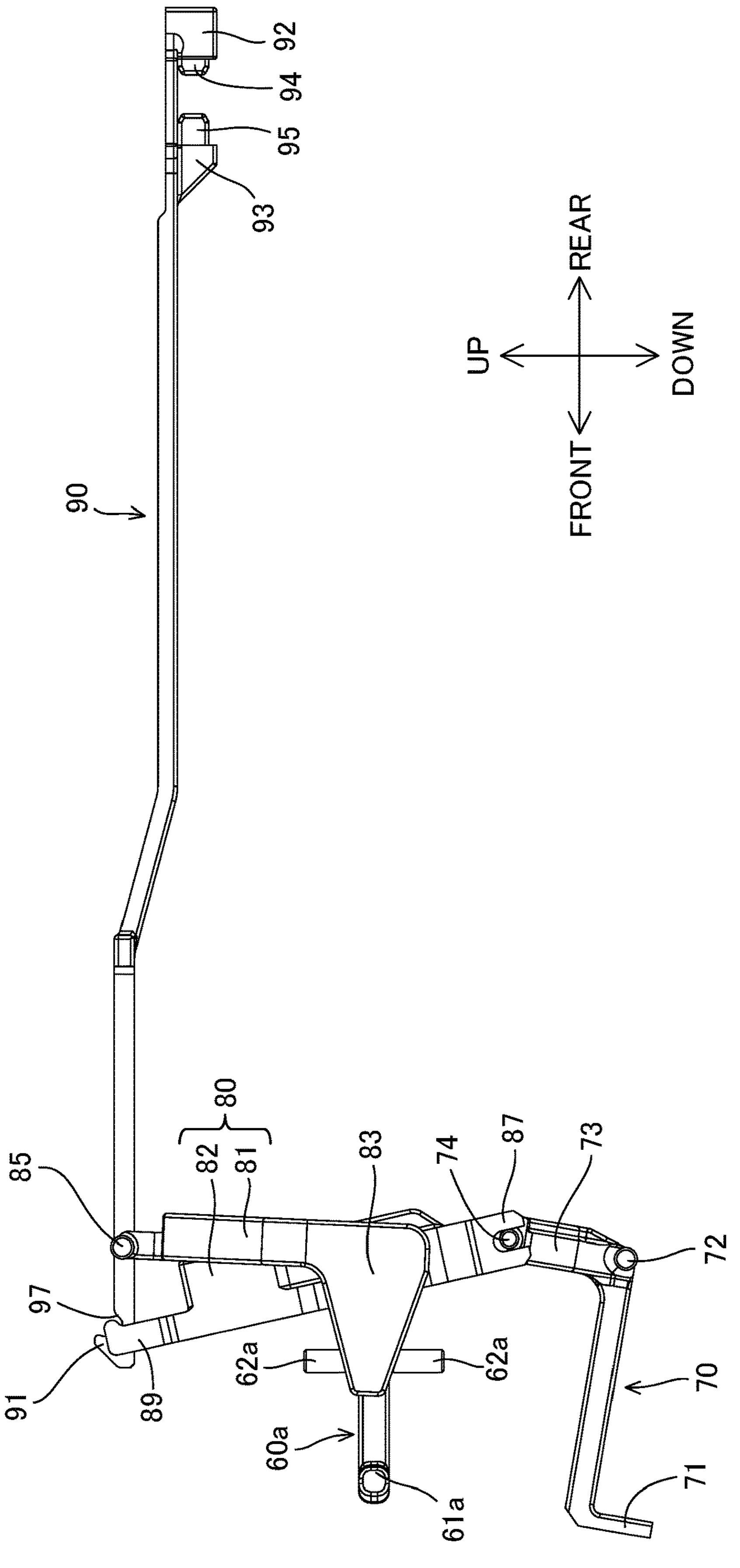
FIG. 19 is a side view illustrating the assembly with both the side handle and the cover attached.
Figure 20:
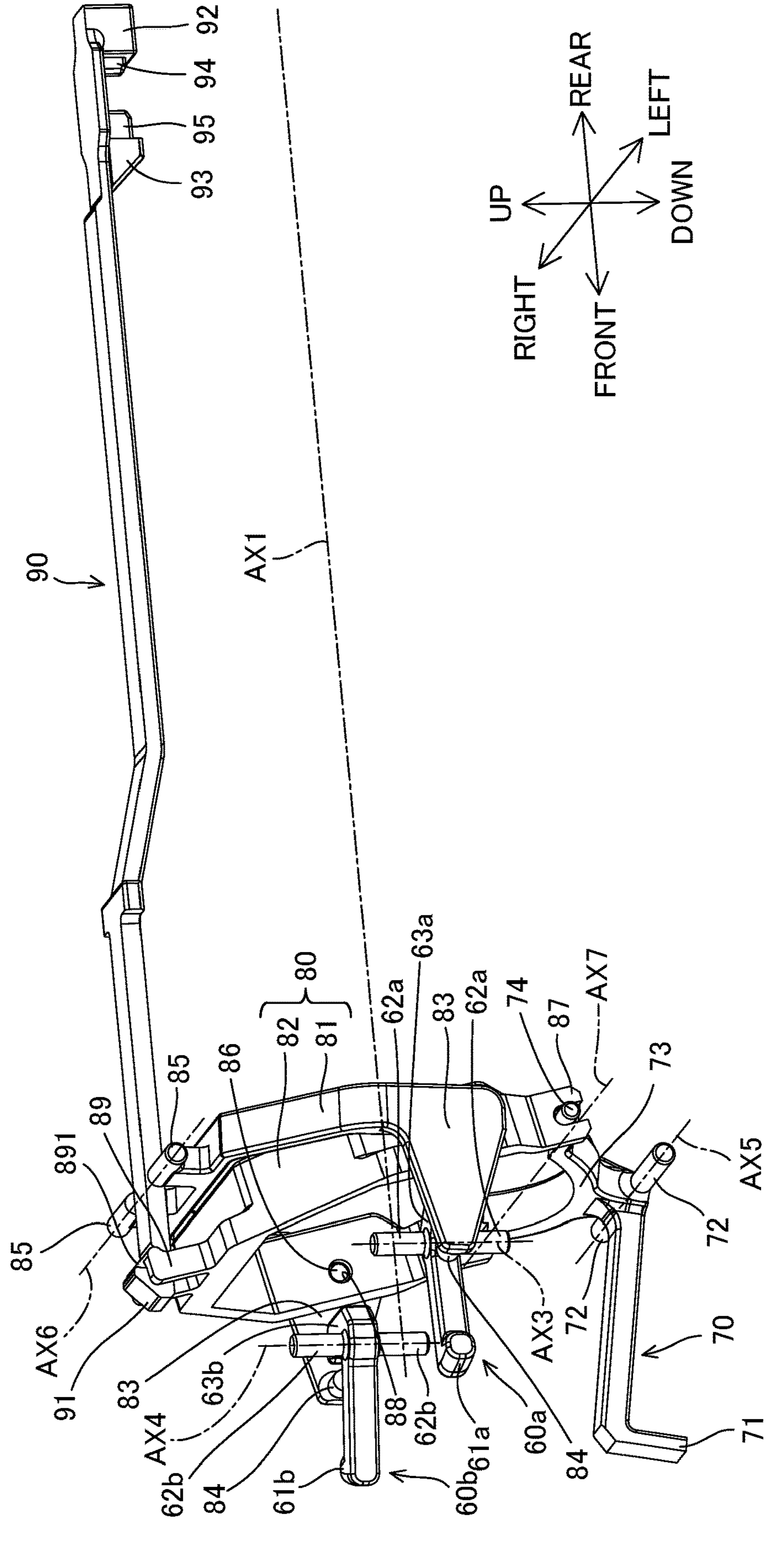
FIG. 20 is a perspective view of the assembly illustrated in FIG. 19.

When both the side handle 200 and the cover 300 are attached, the beam portion 891 of the second member 82 presses the engagement portion 91 forward as illustrated in FIGS. 19 and 20 due to the further pivotal movement of the second member 82 of the first interlock member 80. According thereto, the second interlock member 90 is displaced forward from a position illustrated in FIG. 3 to a position illustrated in FIG. 12 against the biasing force of the coil spring 96. Since the recessed portion 97 is formed at the proximal portion of the engagement portion 91, the beam portion 891 is contained in the recessed portion 97 as illustrated in FIG. 12 when the second interlock member 90 is displaced forward. Therefore, the beam portion 891 does not apply a downward force to the second interlock member 90. As a result, the second interlock member 90 can be smoothly displaced forward.

On the other hand, when at least one of the side handle 200 and the cover 300 is detached, the second member 82 returns from the position illustrated in FIGS. 19 and 20 to the position illustrated in FIGS. 15 and 16 or the position illustrated in FIGS. 17 and 18. As a result, the force with which the beam portion 891 of the second member 82 presses the engagement portion 91 forward is released, and the second interlock member 90 returns to the initial position illustrated in FIG. 3 under the biasing force of the coil spring 96.

In this manner, the second interlock member 90 moves in conjunction with the first interlock member 80 so as to be displaced according to whether the first interlock member 80 is cumulatively displaced. In other words, the second interlock member 90 is displaced forward only when the first interlock member 80 is cumulatively displaced, and is displaced rearward only when the cumulative displacement is released.

Such a displacement of the second interlock member 90 (i.e., the cumulative displacement of the first interlock member 80) is detected by the sensor 44. More specifically, as illustrated in FIGS. 4 and 13, the sensor 44 is mounted on a board 441 so as to vertically face the protrusion portion 92 of the second interlock member 90. The sensor 44 is disposed on the rear side with respect to the electric motor 31. In the present embodiment, the sensor 44 is a Hall sensor. A magnet 49 is embedded in the protrusion portion 92 so as to be exposed downward. As illustrated in FIGS. 4 and 13, the magnet 49 passes over across the sensor 44 in the front-rear direction when the second interlock member 90 is displaced in the front-rear direction. In the present embodiment, the sensor 44 is a bipolar detection-type sensor, and the magnet 49 is configured in such a manner that the N pole and the S pole are arranged in the front-rear direction. Therefore, the sensor 44 can detect the displacement of the second interlock member 90 (the cumulative displacement of the first interlock member 80) based on which of the N pole and the S pole is detected. The type of the sensor 44 is not especially limited, and, for example, may be a unipolar detection-type Hall sensor or may be any known type of magnetic sensor other than the Hall sensor (for example, an MR sensor). The layout of the switch 41 and the magnet 49 can be changed as appropriate according to the characteristics of the sensor 44.

This sensor 44 is electrically connected to the controller 43, and an output of the sensor 44 is input to the controller 43. When the displacement of the second interlock member 90 (the cumulative displacement of the first interlock member 80) is not detected by the sensor 44, i.e., at least one of the side handle 200 and the cover 300 is not attached, the controller 43 prohibits the driving of the electric motor 31 (i.e., the power supply to the electric motor 31). On the other hand, when the displacement of the second interlock member 90 (the cumulative displacement of the first interlock member 80) is detected by the sensor 44, i.e., both the side handle 200 and the cover 300 are attached, the controller 43 permits the driving of the electric motor 31 upon the transmission of the control signal indicating that the switch 41 is in the ON state from the switch 41 to the controller 43. Such prohibition/permission control regarding the driving of the electric motor 31 may be realized by software executed by a CPU of the controller 43 or may be performed only by hardware (for example, a switching element that switches on/off the electric connection between the controller 43 and the electric motor 31 according to an input from the sensor 44 may be used).

According to the above-described grinder 10, a novel structure is provided in which the power supply to the electric motor 31 is permitted only in the state that both the side handle 200 and the cover 300 are attached and thus the first interlock member 80 is cumulatively displaced by moving in conjunction with the first intermediate member 60*a* or 60*b* and the second intermediate member 70. Therefore, the grinder 10 can improve the design flexibility of the grinder having the structure in which the power supply to the motor is permitted only in the state that both the side handle and the cover are attached thereto. For example, the first intermediate members 60*a* and 60*b*, the second intermediate member 70, and the first interlock member 80 can be collectively disposed in a free space in the intermediate housing 36, like the above-described embodiment. Further, since the first interlock member 80 moves in conjunction with both the first intermediate member 60*a* or 60*b* and the second intermediate member 70 (i.e., the first interlock member 80 is shared by the first intermediate member 60*a* or 60*b* and the second intermediate member 70), the grinder 10 can efficiently realize the configuration that permits the power supply to the electric motor 31 only in the state that both the side handle 200 and the cover 300 are attached. For example, the attachment of both the side handle 200 and the cover 300 can be detected using the single sensor 44. The reduction in the number of sensors can lead to a reduction in the number of electronic components and thus a reduction in the number of wiring processes, thereby facilitating the manufacturing.

Further, according to the grinder 10, the first intermediate members 60*a* and 60*b*, the second intermediate member 70, and the first interlock member 80 are disposed on the front side with respect to the electric motor 31, and the sensor 44 and the controller 43 (i.e., electronic components) are disposed on the rear side with respect to the electric motor 31. Then, the cumulative displacement of the first interlock member 80 is detected by the sensor 44 via the second interlock member 90. Therefore, the portion on the front side with respect to the electric motor 31 (for example, the intermediate housing 36) does not have to be designed for insulation. This can make the grinder 10 compact. Further, a wiring for electrically connecting the sensor 44 and the controller 43 does not have to be laid so as to extend across the electric motor 31, and therefore the wiring length can be reduced and the wiring installability can also be improved.

Further, according to the grinder 10, although the attachment direction for attaching the side handle 200 to the first attachment portion 29*a* or the first attachment portion 29*b* (approximately the left-right direction) and the attachment direction for attaching the cover 300 to the second attachment portion 22 (the vertical direction) are different, the respective pressing forces of the side handle 200 and the cover 300 applied in these two attachment directions are converted into the same direction as each other (the front-rear direction) with the aid of the first intermediate member 60*a* or 60*b* and the second intermediate member 70. Therefore, the above-described two attachment directions do not have to match each other, and thus the design flexibility of the grinder 10 can be improved.

Further, according to the grinder 10, the first intermediate member 60*a* or 60*b* moves in conjunction with the first interlock member 80 by moving pivotally and pressing the first interlock member 80 (the first member 81) when being pressed by the side handle 200. Further, the second intermediate member 70 moves in conjunction with the first interlock member 80 by moving pivotally and pressing the first interlock member 80 (the second member 82) when being pressed by the cover 300. The first intermediate members 60*a* and 60*b* and the second intermediate member 70 are configured to be pivotal in this manner, whereby the respective pressing forces of the side handle 200 and the cover 300 applied in the above-described two attachment directions can be converted into the same direction as each other with a small number of members.

Further, according to the grinder 10, the first attachment portions 29*a* and 29*b* and the first intermediate members 60*a* and 60*b* are disposed so as to be symmetric with each other with respect to the plane P1 (refer to FIG. 11) containing the rotational axis AX1 of the electric motor 31. Then, the first intermediate members 60*a* and 60*b* are configured to move pivotally in opposite directions from each other when the side handle 200 is attached. Due to this configuration, regardless of which of the first attachment portion 29*a* and 29*b* is used to attach the side handle 200 thereto, the grinder 10 allows the first intermediate member 60*a* or 60*b* corresponding to this attachment position to move in conjunction with the first interlock member 80. Therefore, the grinder 10 allows the user to select the attachment position of the side handle 200 from the first attachment portions 29*a* and 29*b*, thereby achieving excellent convenience for the user.

Further, according to the grinder 10, the first intermediate members 60*a* and 60*b* biased by the torsion springs 64*a* and 64*b* in the opposite directions from each other, respectively, are in the non-pressing state of not pressing the first interlock member 80 (the first member 81) at the initial positions (refer to FIG. 5) where they are not pressed by the side handle 200. Therefore, when the side handle 200 is attached to the first attachment portion 29*a* and the first intermediate member 60*a* moves pivotally to press the first interlock member 80 (the first member 81), the first intermediate member 60*b* disposed on the side opposite from the first intermediate member 60*a* with respect to the plane P1 (refer to FIG. 11) does not press the first interlock member 80 (the first member 81) in the direction opposite from the pressing direction of the first intermediate member 60*a* under the biasing forces of the torsion springs 64*b*. Similarly, when the side handle 200 is attached to the first attachment portion

29*b*, the pressing force in the opposite direction from the pressing force of the first intermediate member 60*b* is applied from the first intermediate member 60*a* to the first interlock member 80 (the first member 81). Therefore, the first interlock member 80 can be smoothly displaced in the intended direction. A similar effect can also be acquired even when the first intermediate members 60*a* and 60*b* are in the state of not contacting the first interlock member 80 (the first member 81) at the initial positions (refer to FIG. 5).

Further, according to the grinder 10, the first interlock member 80 includes the first member 81 and the second member 82. The first member 81 is supported pivotally on the intermediate housing 36, and moves in conjunction with the first intermediate member 60*a* or the first intermediate member 60*b* by being pressed by the first intermediate member 60*a* or the first intermediate member 60*b* when the side handle 200 is attached. The second member 82 is engaged with the first member 81, and moves in conjunction with the second intermediate member 70 and the first member 81. According to this configuration, since the first member 81 is pivotally supported by the intermediate housing 36, the first member 81 and thus the first interlock member 80 can smoothly move pivotally even when the side handle 200 is attached and the first member 81 is pressed by only one of the first intermediate member 60*a* and the first intermediate member 60*b* (i.e., pressed on only one of the right side and the left side of the first member 81).

Having described the embodiments of the present disclosure, the above-described embodiments are intended to only facilitate the understanding of the present teaching, and are not intended to limit the present invention thereto. The present invention can be modified or improved without departing from the spirit thereof, and includes equivalents thereof. Further, each of the elements described in the claims and the specification can be combined in any manner or omitted in any manner within a range that allows it to remain capable of solving at least a part of the above-described problems or bringing about at least a part of the above-described advantageous effects.

For example, in a case where the sensor 44 is disposed on the front side with respect to the electric motor 31, the second interlock member 90 may be omitted. In this case, the magnet 49 may be embedded in the first interlock member 80 (the second member 82), and the sensor 44 may directly detect the cumulative displacement of the first interlock member 80.

Further, any type of sensor that detects the cumulative displacement of the first interlock member 80 directly or indirectly (for example, via the second interlock member 90) may be used instead of the sensor 44. Such a sensor may be a micro switch, or may be a photoelectric sensor, an ultrasonic distance sensor, or the like.

Further, the first intermediate member 60*a* or 60*b* may be indirectly pressed by the side handle 200 via another additional movable member when the side handle 200 is attached. Similarly, the second intermediate member 70 may be indirectly pressed by the cover 300 via another additional movable member when the cover 300 is attached.

Further, the mechanism that transmits the displacements of the first intermediate member 60*a* or 60*b* and the second intermediate member 70 to the first interlock member 80 and the mechanism that transmits the displacement of the first interlock member 80 to the second interlock member 90 may be realized by any mechanical mechanism (for example, a link mechanism) without being limited to the above-described embodiments.

Further, the number of first attachment portions for attaching the side handle 200 may be one. In this case, the number of first intermediate members is also changed to one. Further, the first interlock member 80 may have any structure capable of realizing the above-described cumulative displacement, and may be, for example, formed by one member.

Further, the configuration that permits the driving of the electric motor 31 only in the state that both the side handle 200 and the cover 300 are attached and the first interlock member 80 is cumulatively displaced may be realized mechanically instead of being realized electrically by the controller 43. For example, an operation member for switching the switch between the ON state and the OFF state (for example, a slide switch) may be disposed on the upper surface of the intermediate housing 36. In this case, a displacement of the operation member from the OFF position to the ON position may be restricted by abutment of the operation member or an additional interlock member that moves in conjunction with the operation member against the first interlock member 80 or an additional interlock member that moves in conjunction with the first interlock member 80 in the state that the first interlock member 80 is not cumulatively displaced. Further, the driving of the electric motor 31 may be permitted according to retraction of the first interlock member 80 or the additional interlock member that moves in conjunction with the first interlock member 80 to a position at which it does not impede the displacement of the operation member from the OFF position to the ON position in the state that the first interlock member 80 is cumulatively displaced. The sensor 44 can be omitted in such an alternative embodiment.

Further, the above-described embodiments can be applied to not only the grinder 10 but also any electric tool configured to allow two types of accessories to be attached thereto.

The corresponding relationship between each component in the above-described embodiments and each component in the claims will b e described below. However, each component in the embodiments is merely one example and shall not limit each component in the claims. The grinder 10 is one example of an "electric tool." The electric motor 31 is one example of a "motor." The side handle 200 is one example of a "first accessory." The cover 300 is one example of a "second accessory." The first attachment portions 29*a* and 29*b* are one example of a "first attachment portion" and are examples of a "third-side attachment portion" and a "fourth-side attachment portion," respectively. The second attachment portion 22 is one example of a "second attachment portion." The first intermediate members 60*a* and 60*b* are one example of a "first intermediate member" and are examples of a "third-side intermediate member" and a "fourth-side intermediate member," respectively. The second intermediate member 70 is one example of a "second intermediate member." The first interlock member 80 is one example of a "first interlock member." The sensor 44 is one example of a "sensor." The controller 43 is one example of a "controller." The second interlock member 90 is one example of a "second interlock member." The plane P1 is one example of a "plane." The first pivotal axis AX3 is one example of a "first pivotal axis." The second pivotal axis AX4 is one example of a "second pivotal axis." The torsion springs 64*a* and 64*b* are examples of a "first biasing member" and a "second biasing member," respectively. The intermediate housing 36 is one example of a "housing." The first member 81 and the second member 82 are examples of "a first member" and a "second member," respectively. The tool accessory 28 is one example of a "tool accessory."

DESCRIPTION OF THE REFERENCE NUMERALS

10: grinder, 20: gear housing, 22: second attachment portion, 23: small bevel gear, 24: large bevel gear, 25: spindle, 26: inner flange, 27: lock nut, 28: tool accessory, 29*a*, 29*b*: first attachment portion, 30: motor housing, 31: electric motor, 32: motor shaft, 33: abutment portion, 34: front-side bearing, 35: rear-side bearing, 36: intermediate housing, 36*a*, 36*b*: boss, 40: handle housing, 41: switch, 42: input member, 43: controller, 44: sensor, 45: link member, 46, 47: arm, 48: pin, 49: magnet, 50: operation member, 51: front end portion, 53: protrusion, 54: lock-off member, 55: abutment edge portion, 56: operation edge portion, 57: pin, 60*a*, 60*b*: first intermediate member, 61*a*, 61*b*: protrusion portion, 62*a*, 62*b*: shaft portion, 63*a*, 63*b*: pressing portion, 64*a*, 64*b*: torsion spring, 70: second intermediate member, 71: pressed portion, 72: shaft portion, 73: arched portion, 74: engagement portion, 75: torsion spring, 80: first interlock member, 81: first member, 82: second member, 83: lower end portion, 84: pressed portion, 85: shaft portion, 86, 87: engagement portion, 88: engagement hole, 89: protrusion upper end portion, 90: second interlock member, 91: engagement portion, 92, 93: protrusion portion, 94, 95: positioning protrusion portion, 96: coil spring, 97: recessed portion, 200: side handle, 210: grip portion, 220: attachment portion, 300: cover, 310: cover main body, 320: attachment portion, 441: board, 891: beam portion, 892: through-hole, P1: plane, AX1, AX2: rotational axis, AX3: first pivotal axis, AX4: second pivotal axis, AX5: third pivotal axis, AX6: fourth pivotal axis, AX7: fifth pivotal axis

What is claimed is:

1. An electric tool comprising:

a motor;

a first attachment portion for detachably attaching a first accessory;

a second attachment portion for detachably attaching a second accessory that is a different type of accessory from the first accessory;

a first intermediate member configured to be displaced by being directly or indirectly pressed by the first accessory when the first accessory is attached to the first attachment portion;

a second intermediate member configured to be displaced by being directly or indirectly pressed by the second accessory when the second accessory is attached to the second attachment portion; and a first interlock member configured to mechanically move in conjunction with the respective displacements of the first intermediate member and the second intermediate member, and configured to be displaced in the same direction between when the first accessory is attached to the first attachment portion and when the second accessory is attached to the second attachment portion, and be cumulatively displaced when the first accessory and the second accessory are attached to the first attachment portion and the second attachment portion, respectively, wherein the electric tool is configured in such a manner that power supply to the motor is permitted only in a state that the first interlock member is cumulatively displaced.

2. The electric tool according to claim 1, further comprising:

a sensor configured to directly or indirectly detect the cumulative displacement of the first interlock member; and a controller configured to control the power supply to the motor and configured to permit the power supply to the motor only in a state that the cumulative displacement of the first interlock member is detected by the sensor.

3. The electric tool according to claim 2, further comprising a second interlock member configured to mechanically move in conjunction with the cumulative displacement of the first interlock member, wherein the first intermediate member, the second intermediate member, and the first interlock member are disposed on a first side with respect to the motor in an axial direction that is a direction in which a rotational axis of the motor extends, the sensor and the controller are disposed on a second side opposite from the first side with respect to the motor in the axial direction, the second interlock member extends from the first side to the second side, and the sensor is configured to detect the cumulative displacement of the first interlock member based on the displacement of the second interlock member.

4. The electric tool according to claim 1, wherein a first attachment direction for attaching the first accessory to the first attachment portion and a second attachment direction for attaching the second accessory to the second attachment portion are different from each other, and the first intermediate member and the second intermediate member are configured to transmit a pressing force of the first accessory in the first attachment direction and a pressing force of the second accessory in the second attachment direction to the first interlock member while converting the pressing force of the first accessory and the pressing force of the second accessory into the same direction as each other.

5. The electric tool according to claim 4, wherein the first intermediate member is configured to move in conjunction with the first interlock member by moving pivotally and pressing the first interlock member when being directly or indirectly pressed by the first accessory, and the second intermediate member is configured to move in conjunction with the first interlock member by moving pivotally and pressing the first interlock member when being directly or indirectly pressed by the second accessory.

6. The electric tool according to claim 5, wherein the first attachment portion includes a third-side attachment portion disposed on a third side with respect to a plane containing a rotational axis of the motor and a fourth-side attachment portion disposed on a fourth side opposite from the third side with respect to the plane to allow the first accessory to be selectively attached, the third-side attachment portion and the fourth-side attachment portion are disposed so as to be symmetric with each other with respect to the plane, the first intermediate member includes a third-side intermediate member disposed adjacent to the third-side attachment portion and a fourth-side intermediate member disposed adjacent to the fourth-side attachment portion, the third-side intermediate member and the fourth-side intermediate member are disposed so as to be symmetric with each other with respect to the plane, the third-side intermediate member is configured to be pivotal about a first pivotal axis, the fourth-side intermediate member is configured to be pivotal about a second pivotal axis extending in the same direction as the first pivotal axis, and a first pivotal direction is opposite from a second pivotal direction, the first pivotal direction being a direction in which the third-side intermediate member moves pivotally when being directly or indirectly pressed by the first accessory, the second pivotal direction being a direction in which the fourth-side intermediate member moves pivotally when being directly or indirectly pressed by the first accessory.

7. The electric tool according to claim 6, further comprising:

a first biasing member configured to bias the third-side intermediate member in a direction opposite from the first pivotal direction; and a second biasing member configured to bias the fourth-side intermediate member in a direction opposite from the second pivotal direction, wherein each of the third-side intermediate member and the fourth-side intermediate member is in a non-contact state of not contacting the first interlock member or a non-pressing state of not pressing the first interlock member when being not directly or indirectly pressed by the first accessory.

8. The electric tool according to claim 6, further comprising a housing, wherein the first interlock member includes:

a first member pivotally supported by the housing, and configured to move in conjunction with the first intermediate member by being pressed by the third-side intermediate member or the fourth-side intermediate member when the first accessory is attached to any of the third-side attachment portion and the fourth-side attachment portion; and a second member configured to be engaged with the first member and the second intermediate member and move in conjunction with the first member and the second intermediate member.

9. The electric tool according to claim 1, wherein the electric tool is a grinder configured to rotate a tool accessory using a driving force of the motor, wherein the first accessory is a side handle, and the second accessory is a cover that partially covers the tool accessory.

10. The electric tool according to claim 1, further comprising:

a sensor configured to directly or indirectly detect the cumulative displacement of the first interlock member; and a controller configured to control the power supply to the motor and configured to permit the power supply to the motor only in a state that the cumulative displacement of the first interlock member is detected by the sensor, wherein a first attachment direction for attaching the first accessory to the first attachment portion and a second attachment direction for attaching the second accessory to the second attachment portion are different from each other, and the first intermediate member and the second intermediate member are configured to transmit a pressing force of the first accessory in the first attachment direction and a pressing force of the second accessory in the second attachment direction to the first interlock member while converting the pressing force of the first accessory and the pressing force of the second accessory into the same direction as each other.

11. The electric tool according to claim 1, further comprising:

a sensor configured to directly or indirectly detect the cumulative displacement of the first interlock member;

a controller configured to control the power supply to the motor and configured to permit the power supply to the motor only in a state that the cumulative displacement of the first interlock member is detected by the sensor; and a second interlock member configured to mechanically move in conjunction with the cumulative displacement of the first interlock member, wherein the first intermediate member, the second intermediate member, and the first interlock member are disposed on a first side with respect to the motor in an axial direction that is a direction in which a rotational axis of the motor extends, the sensor and the controller are disposed on a second side opposite from the first side with respect to the motor in the axial direction, the second interlock member extends from the first side to the second side, the sensor is configured to detect the cumulative displacement of the first interlock member based on the displacement of the second interlock member, a first attachment direction for attaching the first accessory to the first attachment portion and a second attachment direction for attaching the second accessory to the second attachment portion are different from each other, and the first intermediate member and the second intermediate member are configured to transmit a pressing force of the first accessory in the first attachment direction and a pressing force of the second accessory in the second attachment direction to the first interlock member while converting the pressing force of the first accessory and the pressing force of the second accessory into the same direction as each other.

12. The electric tool according to claim 1, further comprising:

a sensor configured to directly or indirectly detect the cumulative displacement of the first interlock member;

a controller configured to control the power supply to the motor and configured to permit the power supply to the motor only in a state that the cumulative displacement of the first interlock member is detected by the sensor; and a second interlock member configured to mechanically move in conjunction with the cumulative displacement of the first interlock member, wherein the first intermediate member, the second intermediate member, and the first interlock member are disposed on a first side with respect to the motor in an axial direction that is a direction in which a rotational axis of the motor extends, the sensor and the controller are disposed on a second side opposite from the first side with respect to the motor in the axial direction, the second interlock member extends from the first side to the second side, the sensor is configured to detect the cumulative displacement of the first interlock member based on the displacement of the second interlock member, a first attachment direction for attaching the first accessory to the first attachment portion and a second attachment direction for attaching the second accessory to the second attachment portion are different from each other, the first intermediate member and the second intermediate member are configured to transmit a pressing force of the first accessory in the first attachment direction and a pressing force of the second accessory in the second attachment direction to the first interlock member while converting the pressing force of the first accessory and the pressing force of the second accessory into the same direction as each other, the first intermediate member is configured to move in conjunction with the first interlock member by moving pivotally and pressing the first interlock member when being directly or indirectly pressed by the first accessory, and the second intermediate member is configured to move in conjunction with the first interlock member by moving pivotally and pressing the first interlock member when being directly or indirectly pressed by the second accessory.

13. The electric tool according to claim 1, further comprising:

a sensor configured to directly or indirectly detect the cumulative displacement of the first interlock member;

a controller configured to control the power supply to the motor and configured to permit the power supply to the motor only in a state that the cumulative displacement of the first interlock member is detected by the sensor; and a second interlock member configured to mechanically move in conjunction with the cumulative displacement of the first interlock member, wherein the first intermediate member, the second intermediate member, and the first interlock member are disposed on a first side with respect to the motor in an axial direction that is a direction in which a rotational axis of the motor extends, the sensor and the controller are disposed on a second side opposite from the first side with respect to the motor in the axial direction, the second interlock member extends from the first side to the second side, the sensor is configured to detect the cumulative displacement of the first interlock member based on the displacement of the second interlock member, a first attachment direction for attaching the first accessory to the first attachment portion and a second attachment direction for attaching the second accessory to the second attachment portion are different from each other, the first intermediate member and the second intermediate member are configured to transmit a pressing force of the first accessory in the first attachment direction and a pressing force of the second accessory in the second attachment direction to the first interlock member while converting the pressing force of the first accessory and the pressing force of the second accessory into the same direction as each other, the first intermediate member is configured to move in conjunction with the first interlock member by moving pivotally and pressing the first interlock member when being directly or indirectly pressed by the first accessory, the second intermediate member is configured to move in conjunction with the first interlock member by moving pivotally and pressing the first interlock member when being directly or indirectly pressed by the second accessory, the first attachment portion includes a third-side attachment portion disposed on a third side with respect to a plane containing the rotational axis of the motor and a fourth-side attachment portion disposed on a fourth side opposite from the third side with respect to the plane to allow the first accessory to be selectively attached, the third-side attachment portion and the fourth-side attachment portion are disposed so as to be symmetric with each other with respect to the plane, the first intermediate member includes a third-side intermediate member disposed adjacent to the third-side attachment portion and a fourth-side intermediate member disposed adjacent to the fourth-side attachment portion, the third-side intermediate member and the fourth-side intermediate member are disposed so as to be symmetric with each other with respect to the plane, the third-side intermediate member is configured to be pivotal about a first pivotal axis, the fourth-side intermediate member is configured to be pivotal about a second pivotal axis extending in the same direction as the first pivotal axis, and a first pivotal direction is opposite from a second pivotal direction, the first pivotal direction being a direction in which the third-side intermediate member moves pivotally when being directly or indirectly pressed by the first accessory, the second pivotal direction being a direction in which the fourth-side intermediate member moves pivotally when being directly or indirectly pressed by the first accessory.

14. The electric tool according to claim 7, further comprising a housing, wherein the first interlock member includes:

a first member pivotally supported by the housing, and configured to move in conjunction with the first intermediate member by being pressed by the third-side intermediate member or the fourth-side intermediate member when the first accessory is attached to any of the third-side attachment portion and the fourth-side attachment portion; and a second member configured to be engaged with the first member and the second intermediate member and move in conjunction with the first member and the second intermediate member.

* * * * *